(12) United States Patent
Sutardja

(10) Patent No.: US 7,577,247 B1
(45) Date of Patent: *Aug. 18, 2009

(54) APPARATUS AND METHOD FOR TELEPHONE, INTERCOM, AND CLOCK

(75) Inventor: Sehat Sutardja, Los Altos Hills, CA (US)

(73) Assignee: Marvell International Ltd., Hamilton (BM)

(*) Notice: Subject to any disclaimer, the term of this patent is extended or adjusted under 35 U.S.C. 154(b) by 814 days.

This patent is subject to a terminal disclaimer.

(21) Appl. No.: 10/690,022

(22) Filed: Oct. 20, 2003

Related U.S. Application Data

(63) Continuation-in-part of application No. 10/184,505, filed on Jun. 26, 2002, and a continuation-in-part of application No. 10/184,302, filed on Jun. 26, 2002, now Pat. No. 7,457,676, and a continuation-in-part of application No. 10/184,299, filed on Jun. 26, 2002, now Pat. No. 7,315,764, and a continuation-in-part of application No. 09/659,693, filed on Sep. 11, 2000.

(60) Provisional application No. 60/211,874, filed on Jun. 14, 2000.

(51) Int. Cl.
*H04M 1/03* (2006.01)
(52) U.S. Cl. .............. 379/374.01; 370/493; 375/222; 455/413; 700/94
(58) Field of Classification Search .......... 379/88.07, 379/374.01, 474.01; 375/222; 370/493; 700/94; 455/413
See application file for complete search history.

(56) References Cited

U.S. PATENT DOCUMENTS 3,878,514 A 4/1975 Faber
3,925,763 A 12/1975 Wadhwani et al.
4,215,408 A 7/1980 Games et al.
4,755,792 A 7/1988 Pezzolo et al.

(Continued)

FOREIGN PATENT DOCUMENTS

EP 0 982 732 A1 3/2000

(Continued)

OTHER PUBLICATIONS

Settles, Curtis, DSP-Augmented CPU Cores Promise Performance Boost for Ultra-Compact Drives, Data Storage, May 2000, pp. 35-38, PennWell, US.

(Continued)

*Primary Examiner*—Gerald Gauthier

(57) ABSTRACT

The invention features a telephone, intercom, and clock. The telephone comprises a receiver adapted to receive a signal representing encoded first voice data; a processor comprising a media access controller adapted to obtain the encoded first voice data from the signal, and a digital signal processor adapted to decode the first voice data obtained by the media access controller; an output circuit; a digital-to-analog converter adapted to convert the first voice data decoded by the digital signal processor to a first analog signal, wherein the first analog signal is output to the output circuit; an input circuit; an analog-to-digital converter adapted to receive a second analog signal from the input circuit, and to convert the second analog signal to second voice data; wherein the digital signal processor is further adapted to encode the second voice data; and a transmitter adapted to transmit signals representing the encoded second voice data.

30 Claims, 30 Drawing Sheets

U.S. PATENT DOCUMENTS

| | | | |
|---|---|---|---|
| 4,760,547 A | 7/1988 | Duxbury | |
| 4,821,027 A | 4/1989 | Mallory et al. | |
| 4,897,630 A | 1/1990 | Nykerk | |
| 5,038,268 A | 8/1991 | Krause et al. | |
| 5,083,122 A | 1/1992 | Clark | |
| 5,148,546 A | 9/1992 | Blodgett | |
| 5,479,151 A | 12/1995 | Lavelle et al. | |
| 5,511,000 A | 4/1996 | Kaloi et al. | |
| 5,552,766 A | 9/1996 | Lee et al. | |
| 5,682,142 A | 10/1997 | Loosmore et al. | |
| 5,686,885 A | 11/1997 | Bergman | |
| 5,687,325 A | 11/1997 | Chang | |
| 5,724,475 A | 3/1998 | Kirsten | |
| 5,727,231 A | 3/1998 | Bartley et al. | |
| 5,771,174 A | 6/1998 | Spinner et al. | |
| 5,818,389 A | 10/1998 | Lazar | |
| 5,825,202 A | 10/1998 | Tavana et al. | |
| 5,880,775 A | 3/1999 | Ross | |
| 5,903,871 A | 5/1999 | Terui et al. | |
| 5,917,405 A | 6/1999 | Joao | |
| 6,011,666 A | 1/2000 | Wakamatsu | |
| 6,061,306 A | 5/2000 | Buchheim | |
| 6,111,580 A | 8/2000 | Kazama et al. | |
| 6,118,269 A | 9/2000 | Davis | |
| 6,119,091 A | 9/2000 | Huang et al. | |
| 6,181,994 B1 | 1/2001 | Colson et al. | |
| 6,208,263 B1 | 3/2001 | Strand | |
| 6,225,901 B1 | 5/2001 | Kail, IV | |
| 6,233,393 B1 | 5/2001 | Yanagihara et al. | |
| 6,271,752 B1 | 8/2001 | Vaios | |
| 6,281,790 B1 | 8/2001 | Kimmel et al. | |
| 6,289,099 B1 * | 9/2001 | Edgar, III | 379/374.01 |
| 6,292,108 B1 | 9/2001 | Straser et al. | |
| 6,308,253 B1 | 10/2001 | Gadre et al. | |
| 6,332,175 B1 | 12/2001 | Birrell et al. | |
| 6,334,025 B1 | 12/2001 | Yamagami | |
| 6,370,448 B1 | 4/2002 | Eryurek | |
| 6,389,423 B1 | 5/2002 | Sakakura | |
| 6,441,731 B1 | 8/2002 | Hess | |
| 6,476,858 B1 | 11/2002 | Ramirez Diaz et al. | |
| 6,496,692 B1 | 12/2002 | Shanahan | |
| 6,516,039 B1 | 2/2003 | Taura et al. | |
| 6,553,404 B2 | 4/2003 | Stern | |
| 6,585,168 B1 | 7/2003 | Caprio | |
| 6,594,272 B1 | 7/2003 | Ketcham et al. | |
| 6,603,808 B1 * | 8/2003 | Anne et al. | 375/222 |
| 6,618,812 B2 | 9/2003 | Seiler et al. | |
| 6,624,750 B1 | 9/2003 | Marman et al. | |
| 6,671,343 B1 | 12/2003 | Ito | |
| 6,697,103 B1 | 2/2004 | Fernandez et al. | |
| 6,727,811 B1 | 4/2004 | Fendis | |
| 6,763,182 B1 | 7/2004 | Endo et al. | |
| 6,772,212 B1 | 8/2004 | Lau et al. | |
| 6,859,831 B1 | 2/2005 | Gelvin et al. | |
| 6,867,683 B2 | 3/2005 | Calvesio et al. | |
| 6,950,946 B1 | 9/2005 | Droz et al. | |
| 6,970,081 B1 | 11/2005 | Cheng | |
| 6,975,220 B1 | 12/2005 | Foodman et al. | |
| 7,171,281 B2 | 1/2007 | Weber et al. | |
| 7,242,294 B2 | 7/2007 | Warrior et al. | |
| 2002/0002425 A1 | 1/2002 | Dossey et al. | |
| 2002/0019925 A1 | 2/2002 | Dewhurst et al. | |
| 2002/0167590 A1 | 11/2002 | Naidoo et al. | |
| 2005/0125083 A1 | 6/2005 | Kiko | |
| 2005/0128068 A1 | 6/2005 | Winick et al. | |
| 2006/0181425 A1 | 8/2006 | Crane et al. | |

FOREIGN PATENT DOCUMENTS

| | | | |
|---|---|---|---|
| EP | 0 999 549 A2 | 5/2000 | |
| WO | WO 99/48296 A1 | 9/1999 | |

OTHER PUBLICATIONS

Quantum, Part 2: A Closer Look at Hard Disk Drives; Chapter 3: Inside Hard Disk Drives, Quantum Online, Jun. 7, 2000, pp. 1-3, Quantum, US.

Quantum, Chapter 4: Recent Technological Developments: The Impact of Leading-Edge Technology on Mass Storage, Quantum Online, Jun. 7, 2000, pp. 1-3, Quantum, US.

IEEE P802.11i/D10.0, Apr. 2004 (Amendment to ANSI/IEEE Std 802.11-1999 (2003 Reaff) edition as arnended by IEEE Std 802.11g-2003 and IEEE Std 802.11h-2003); IEEE Standard for information technology—Telecommunications and information exchange between systems—Local and metropolitan area networks—Specific requirements; Part 11: Wireless Medium Access Control (MAC) and Physical Layer (PHY) specifications: Amendment 6: Medium Access Control (MAC) Security Enhancements; LAN/MAN Committee of the IEEE Computer Society; 184 pages.

ANSI/IEEE Std 802.11, 1999 Edition; Information technology—Telecommunications and information exchange between systems—Local and metropolitan area networks—Specific requirements—Part 11: Wireless LAN Medium Access Control (MAC) and Physical Layer (PHY) Specifications; LAN/MAN Standards Committee of the IEEE Computer Society; 528 pages.

IEEE Std 802.11a,-1999 (Supplement to IEEE Std 802.11-1999) [Adopted by ISO/IEC and redesignated as ISO/IEC 8802-11: 1999/Amd 1:2000(E)]; Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications High-speed Physical Layer in the 5 GHz Band; LAN/MAN Standards Committee of the IEEE Computer Society; 91 pages.

IEEE Std 802.11b-1999 (Supplement to IEEE Std 802.11-1999 Edition); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band; LAN/MAN Standards Committee of the IEEE Computer Society; Sep. 16, 1999 IEEE-SA Standards Board; 96 pages.

IEEE Std 802.11b-1999/Cor 1-2001 (Corrigendum to IEEE Std 802.11-1999); IEEE Standard for Information technology—Telecommunications and information exchange between systems—Local and metropolitan area networks—Specific requirements—Part 11: Wireless LAN Medium Access Control (MAC) and Physical Layer (PHY) specifications Amendment 2: Higher-Speed Physical Layer (PHY) extension in the 2.4 GHz Band—Corrigendum 1; LAN/MAN Standards Committee of the IEEE Computer Society; Nov. 7, 2001; 24 pages.

IEEE P802.11g/D8.2, Apr. 2003 (Supplement to ANSI/IEEE Std 802.11-1999(Reaff 2003)); Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; LAN/MAN Standards Committee of the IEEE Computer Society; 69 pages.

IEEE Std 802.11h—2003 (Amendment to IEEE Std 802.11, 1999 Edition (Reaff 2003)); as amended by IEEE Stds 802.11a-1999, 802.11b-1999, 802.11b-1999/Cor 1-2001, 802.11d-2001, and 802.11g-2003; IEEE Standard for Information technology—Telecommunications and information exchange between systems—Local and metropolitan area networks—Specific requirements—Part 11: Wireless LAN Medium Access Control (MAC) and Physical Layer (PHY) specifications Amendment 5: Spectrum and Transmit Power Management Extensions in the 5 GHz band in Europe; IEEE Computer Society LAN/MAN Standards Committee; Oct. 14, 2003; 74 pages.

Atmel Announces 802.11 Media Access Controller (MAS) with Integrated Baseband for Wireless Applications, Design & Reuse, Aug. 21, 2002.

* cited by examiner

APPARATUS AND METHOD FOR TELEPHONE, INTERCOM, AND CLOCK

CROSS-REFERENCE TO RELATED APPLICATIONS

This application is a continuation-in-part of U.S. Non-Provisional patent application Ser. No. 09/659,693 entitled "Apparatus And Method For Recording And Reproducing Digital Data," filed Sep. 11, 2000, which claims the benefit of U.S. Provisional Patent Application Ser. No. 60/211,874, entitled "Method And Apparatus For Recording And Reproducing Digital Data," filed Jun. 14, 2000, the disclosures thereof incorporated by reference herein in its entirety.

This application is a continuation-in-part of U.S. Non-Provisional patent application Ser. No. 10/184,505 entitled "Apparatus And Method For Recording And Reproducing Digital Data," filed Jun. 26, 2002, the disclosure thereof incorporated by reference herein in its entirety.

This application is a continuation-in-part of U.S. Non-Provisional patent application Ser. No. 10/184,302 entitled "Apparatus And Method For Recording And Reproducing Digital Data," filed Jun. 26, 2002, the disclosure thereof incorporated by reference herein in its entirety.

This application is a continuation-in-part of U.S. Non-Provisional patent application Ser. No. 10/184,299 entitled "Apparatus And Method For Recording And Reproducing Digital Data," filed Jun. 26, 2002, the disclosure thereof incorporated by reference herein in its entirety.

BACKGROUND

The present invention relates generally to an apparatus for recording and reproducing digital data.

FIG. 1 is an example of a conventional MP3 player. MP3 player includes an interface 106, nonvolatile solid state memory 102, a decoder 110, a digital-to-analog (D/A) converter 147, an audio output 116, a key pad 108, a display 112, a controller 104, RAM 144 and ROM 145.

Controller 104 controls the operation of the MP3 player in accordance with a set of programmed instructions. Programmed instructions for controller 104 are stored in non-volatile memory or ROM 145, and RAM 144 is provided as the working memory for controller 104

Typically, MP3 data, which is a digital compressed format representing music data, is initially stored on a personal computer 50 and is subsequently transferred to the MP3 player via interface 106, under control of controller 104. The MP3 data is stored in nonvolatile solid state memory 102. Interface 50 can implemented by a standard parallel port, serial port, USB and the like. Nonvolatile solid state memory 102 may be implemented as flash memory. Generally, for a music quality recording, a nonvolatile solid state memory having 64 Mbytes can store about 1 hour of music. Flash memory provides the capability of retaining the stored digital data even when the MP3 player is powered down. Once the digital data has been transferred to the MP3 player, it no longer needs to be connected to personal computer 50, and the MP3 player can play back the MP3 data autonomously from personal computer 50.

Decoder 110 functions to decode and decompress the MP3 data file stored in nonvolatile solid state memory 102. Decoder 110 decompresses the MP3 music file in accordance controller 104 according to the MP3 format, and decodes the decompressed music file into a bit stream form. The bit stream is then converted into analog form by digital to analog converter 147 for connection to a speaker, earphone and the like.

A decoding program for the MP3 decoder function is stored in the ROM 145 and loaded to RAM 144 by controller 104 as required.

The MP3 player comprises a keypad 108 for allowing user control and interaction with the MP3 player. Such control may include power on/power off, music selection and volume. The MP3 also comprises a display 112 for displaying characters or graphics, such as a battery indicator, a play mode indicator, a volume indicator, available memory size and the title of the music being played.

SUMMARY

In general, in one aspect, the invention features a telephone comprising a receiver adapted to receive a signal representing encoded first voice data; a processor comprising a media access controller adapted to obtain the encoded first voice data from the signal, and a digital signal processor adapted to decode the first voice data obtained by the media access controller; an output circuit; a digital-to-analog converter adapted to convert the first voice data decoded by the digital signal processor to a first analog signal, wherein the first analog signal is output to the output circuit; an input circuit; an analog-to-digital converter adapted to receive a second analog signal from the input circuit, and to convert the second analog signal to second voice data; wherein the digital signal processor is further adapted to encode the second voice data; and a transmitter adapted to transmit signals representing the encoded second voice data.

Particular implementations can include one or more of the following features. The encoded first voice data is decoded by a process that decompresses the encoded first voice data; and the second voice data is encoded by a process that compresses the second voice data. Implementations comprise a vocoder adapted to decode the encoded first voice data and to encode the second voice data. The digital signal processor is further adapted to determine a code of the encoded first voice data obtained by the media access controller; and the vocoder is further adapted to decode the encoded first voice data in accordance with the determined code. Implementations comprise a display; wherein the receiver is further adapted to receive a signal representing information describing a sender of the first voice data; and wherein the processor is further adapted to cause the display to display the information describing the sender of the first voice data. The receiver is further adapted to receive a signal representing information describing a sender of the first voice data; and the processor is further adapted to reject the first voice data when the information describing the sender of the first voice data meets predetermined criteria. Implementations comprise an echo cancellation circuit. Implementations comprise a telephone call indicator adapted to manifest a call indication when the transmitter receives a signal representing an incoming telephone call. Implementations comprise a storage device; wherein the processor is further adapted to answer an incoming telephone call, and to store the encoded first voice data in the storage device. Implementations comprise a voicemail key; wherein, in response to operation of the voicemail key, the digital signal processor is further adapted to decode the encoded first voice data stored in the storage device, and the processor is further adapted to send the decoded second voice data to the output circuit. The receiver is further adapted to receive a telephone call signal representing an incoming telephone call, the telephone call signal comprising a destination telephone number; wherein the processor is further adapted to select a further telephone based on the destination telephone number; and wherein the transmitter is further adapted to send a new call signal to the further telephone. The receiver is further adapted to receive an answer signal from the further telephone in response to the new call signal; and wherein in response to the answer signal, the receiver receives encoded third voice data from the further telephone and encoded fourth voice data from the sender of the telephone call signal, and the transmitter sends the encoded fourth voice data to the sender of the telephone call signal and sends the encoded third voice data to the further telephone. The receiver is a wireless receiver. The transmitter is a wireless transmitter. The telephone complies with a standard selected from the group consisting of IEEE 802.11; IEEE 802.11a; IEEE 802.11b; IEEE 802.11g; IEEE 802.11h; and IEEE 802.11i.

In general, in one aspect, the invention features an intercom comprising an output circuit; a receiver adapted to receive a signal representing encoded voice data; a processor comprising a media access controller adapted to obtain the encoded voice data from the signal, and a digital signal processor adapted to decode the voice data obtained by the media access controller; and a digital-to-analog converter adapted to convert the voice data decoded by the digital signal processor to an analog signal, wherein the analog signal is output to the output circuit.

Particular implementations can include one or more of the following features. The voice data is encoded by a process that compresses the voice data; and the encoded voice data is decoded by a process that decompresses the encoded voice data. The digital signal processor comprises a vocoder adapted to decode the encoded voice data obtained by the media access controller. The digital signal processor is further adapted to determine a code of the encoded voice data obtained by the media access controller; and the vocoder is further adapted to decode the encoded voice data in accordance with the determined code. Implementations comprise a display; wherein the receiver is further adapted to receive a signal representing information describing the sender of the voice data; and wherein the processor is further adapted to cause the display to display the information describing the sender of the voice data. Implementations comprise an input circuit; and a transmitter; wherein the processor is further adapted to receive input signals from the input circuit, and cause the transmitter to transmit control signals representing the input signals. The input circuit comprises a keypad; and wherein the input signals represent operation of the keypad. The input signals represent sounds. The receiver is a wireless receiver. The transmitter is a wireless transmitter. The intercom complies with a standard selected from the group consisting of: IEEE 802.11; IEEE 802.11a; IEEE 802.11b; IEEE 802.11g; IEEE 802.11h; and IEEE 802.11i.

In general, in one aspect, the invention features a clock comprising a display; a receiver adapted to receive a signal representing digital data; and a processor comprising a media access controller adapted to obtain the digital data from the signal, and a microprocessor unit adapted to generate a digital signal representing a time of day based on the digital data; wherein the display shows the time of day based on the digital signal representing the time of day.

Particular implementations can include one or more of the following features. Implementations comprise an alarm unit adapted to produce an alarm indication in response to an alarm signal provided by the processor; wherein the processor provides the alarm signal when the time of day represented by the digital data corresponds to a predetermined alarm time. Implementations comprise a keypad; wherein the predetermined alarm time can be entered on the keypad. Implementations comprise an input circuit; and a transmitter; wherein the processor is further adapted to receive input signals from the input circuit, and cause the transmitter to transmit control signals representing the input signals; wherein a provider of the signal representing the digital data receives the control signals and alters the content of the digital data in response to the control signals. The input circuit comprises a keypad; and the input signals represent operation of the keypad. The receiver is a wireless receiver. The transmitter is a wireless transmitter. An MP3 player comprises the clock. An Internet radio comprising the comprises the clock. A media player comprising the comprises the clock.

The details of one or more implementations are set forth in the accompanying drawings and the description below. Other features will be apparent from the description and drawings, and from the claims.

DESCRIPTION OF DRAWINGS

The leading digit(s) of each reference numeral used in this specification indicates the number of the drawing in which the reference numeral first appears. Like reference numerals refer to like parts.

DETAILED DESCRIPTION

Embodiments of the present invention are directed to an apparatus for reproducing digital data, and in particular one that is portable. In some embodiments, the digital data represents audio and/or video analog data. In general, audio and/or video analog data is first digitized and compressed using one of a variety of formats. During reproduction the digitized data is decompressed and converted to an analog signal. Additionally, while one preferred format for compressing audio data is known as MP3, the present invention is independent of the compression format and not limited to MP3. The compression format therefore may include any other suitable compression format, such as, by way of example, EPAC™, QDesign Music playback, AAC, Liquid Audio, MS Audio, Dolby Digital, and the like.

While implementations of the present invention are discussed in terms of data compression such as MP3, the invention is not limited to data compression, but includes other forms of data encoding that may or may not include data compression. In implementations where the data encoding includes data compression, the media data is encoded by a process that compresses the media data, and the encoded media data is decoded by a process that decompresses the encoded media data.

Figure 1:
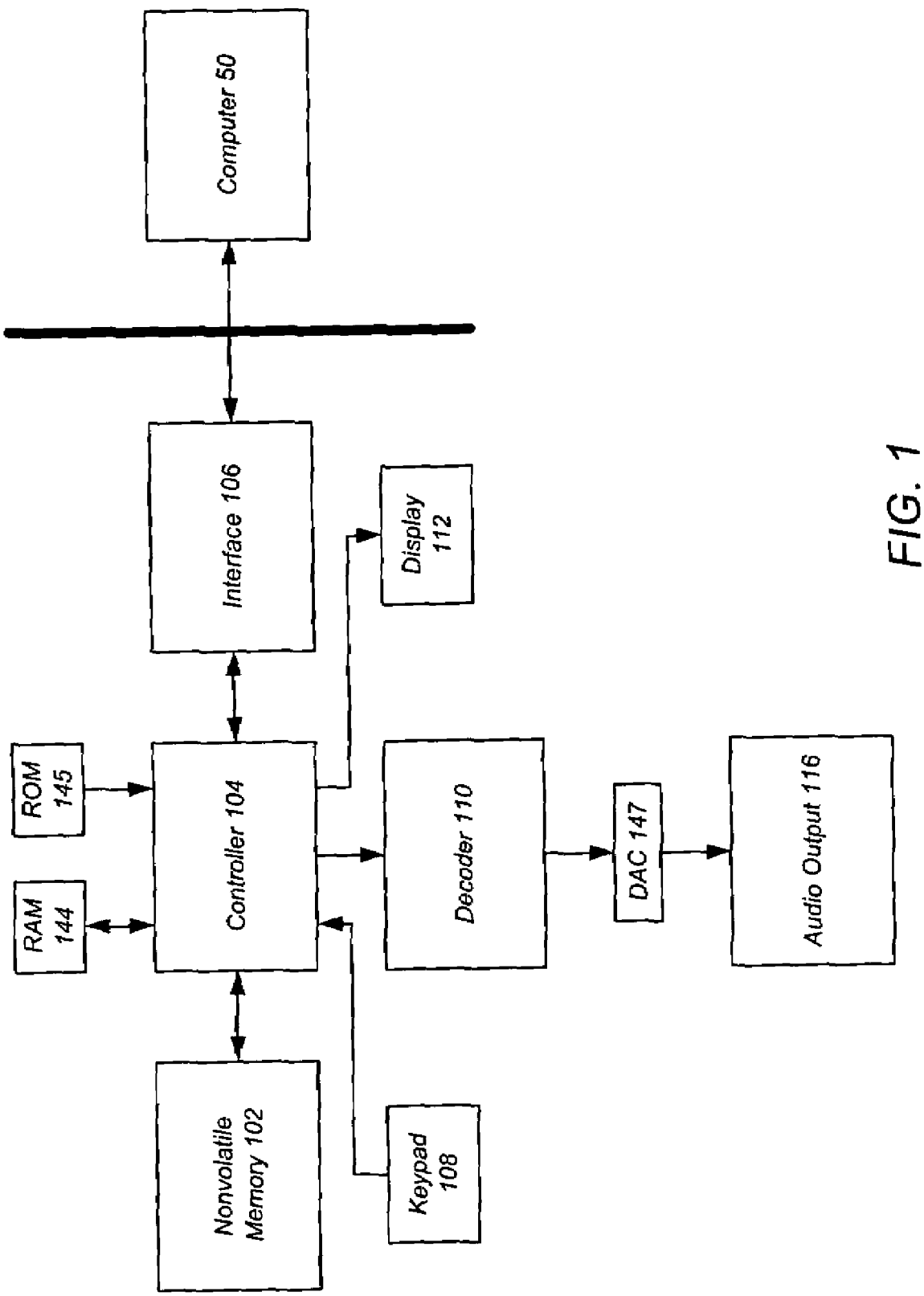
FIG. 1 is a block diagram of a conventional MP3 player.
Figure 2:
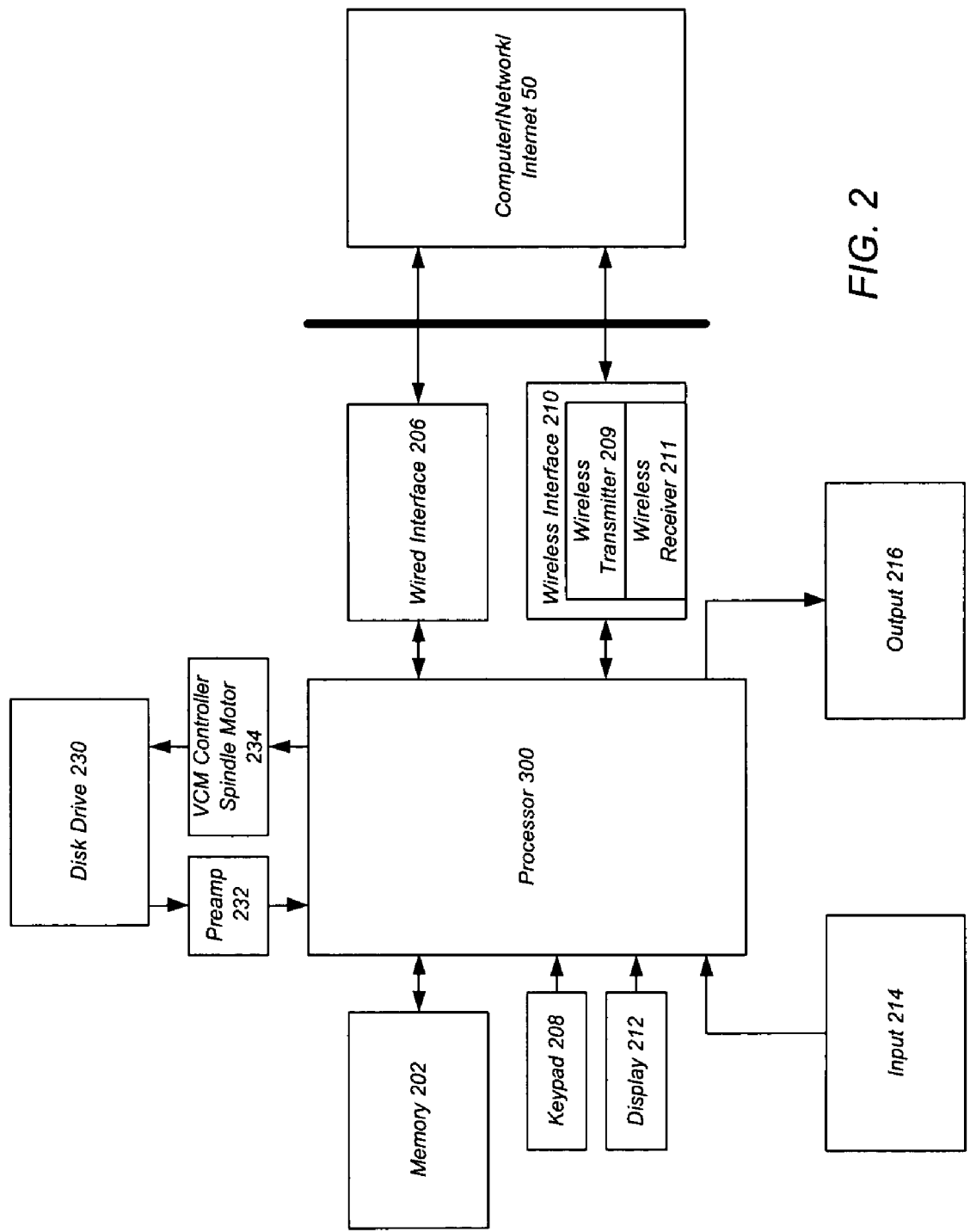
FIG. 2 is a block diagram of a first embodiment of a media player/recorder in accordance with the present invention.

Referring to FIG. 2 there is shown the first embodiment of media player/recorder of the present invention. The media player/recorder includes a wired interface 206, a wireless interface 210, memory 202, a processor 300, an output 216, a keypad 208, a display 212, a storage device (the storage device may utilize, for example, a magnetic media (such as a hard disk drive), magneto-optical media, an optical media (such as a CD ROM, CDR, CDRW or the like), and the like) such as, a disk drive 230, a preamp 232 and a voice coil motor (VCM) 234. Wireless interface 210 includes a wireless transmitter 209 and a wireless receiver 211.

The operation of the media player/recorder is as follows. Operation of the media player/recorder is controlled by the user through keypad 208. Status of the media player/recorder is provided to the user by display 212.

Media data, which was previously digitized, may be obtained (downloaded) from a personal computer, network appliance, local area network, Internet 50 and the like, including wireless networks with infrastructure, such as a designated access point, peer-to-peer wireless networks, and the like. Such external devices communicate with the media player/recorder via wired interface 206 and wireless interface 210, which are controlled by processor 300. Wired interface 206 may be implemented, for example, as a parallel interface, serial interface, USB, Ethernet connection, IEEE 1394 (a.k.a. Firewire), and the like. Wireless interface 210 may be implemented, for example, as an infrared interface, IEEE 802.15, IEEE 802.11, Bluetooth™ and the like. Some embodiments of the present invention comply with one or more of the following standards: IEEE 802.11; IEEE 802.11a; IEEE 802.11b; IEEE 802.11g; IEEE 802.11h; and IEEE 802.11i. Again the present invention is independent of the interface selected. Media data is then stored on the storage device such as, disk drive 230 in accordance with processor 300. Disk drive 230 is preferably a miniature drive with a capacity of 1 Gbyte of data storage, which is particularly suitable for a portable device. Of course, any other appropriate sized disk drive may be employed.

Alternatively, media data may be obtained directly from an external analog source, such as a microphone or video camera, connected to input 214. Input 214 takes the input signal from external device and sets the analog signal to an appropriate level. The analog signal is then converted to a digital signal and compressed using a selected format by processor 300, as will be described herein below. The compressed digital data is similarly stored on disk drive 230.

When the user chooses a selection of media data to be played back with keypad 208, processor 300 powers up disk drive 230 and retrieves the selected data which is then transferred to memory 202. It is noted that the powering up of the device is done in a sequential manner so as to minimize energy consumption of the device. A more detailed description is provided below.

Memory 202 comprises a solid state memory, such as, for example dynamic random access memory (solid state memory), flash memory, EEPROM, or the like. It is not necessary for memory 202 to be nonvolatile since the media data is stored in a nonvolatile manner on storage device or disk drive 230. The quantity of solid state memory required is less than is required in a conventional MP3 player. The quantity of solid state memory contemplate is about 2 Mbytes, which is sufficient to store about 2 minutes of MP3 data. Of course, as will be appreciated by one of ordinary skill in the art, when dealing with video data, more solid state memory may be required. The amount of solid state memory supplied is selected to minimize energy consumption.

After the selected data is stored in memory 202, disk drive 230 is then powered down. In this manner, during playback disk drive 230 is powered up only during the transfer of the selected media data from disk drive 230 to memory 202, which results in lower energy consumption. A more detailed description of the powering down of disk drive 230 is provided herein below. The media data is retrieved from memory 202. Processor 300 determines the format of data compression from the retrieved data. Disk drive 230, also stores the data compression/decompression algorithms. The data is decompressed in accordance with the determined format and converted to an analog signal by processor 300. The analog signal is set to an appropriate level by output circuit 216. If the analog signal contains audio data, output circuit 216 is connected to a speaker, headphone and the like for playback, and if the analog signal contains video data, output circuit 216 is connected to a display device for playback.

Additionally, media data recorded on disk drive 230 or stored in memory 202 may be transferred (uploaded) to a personal computer, network appliance, local area network, internet 50 or another media player/recorder through interfaces 206 and 210 under the control of processor 300.

Figure 3:
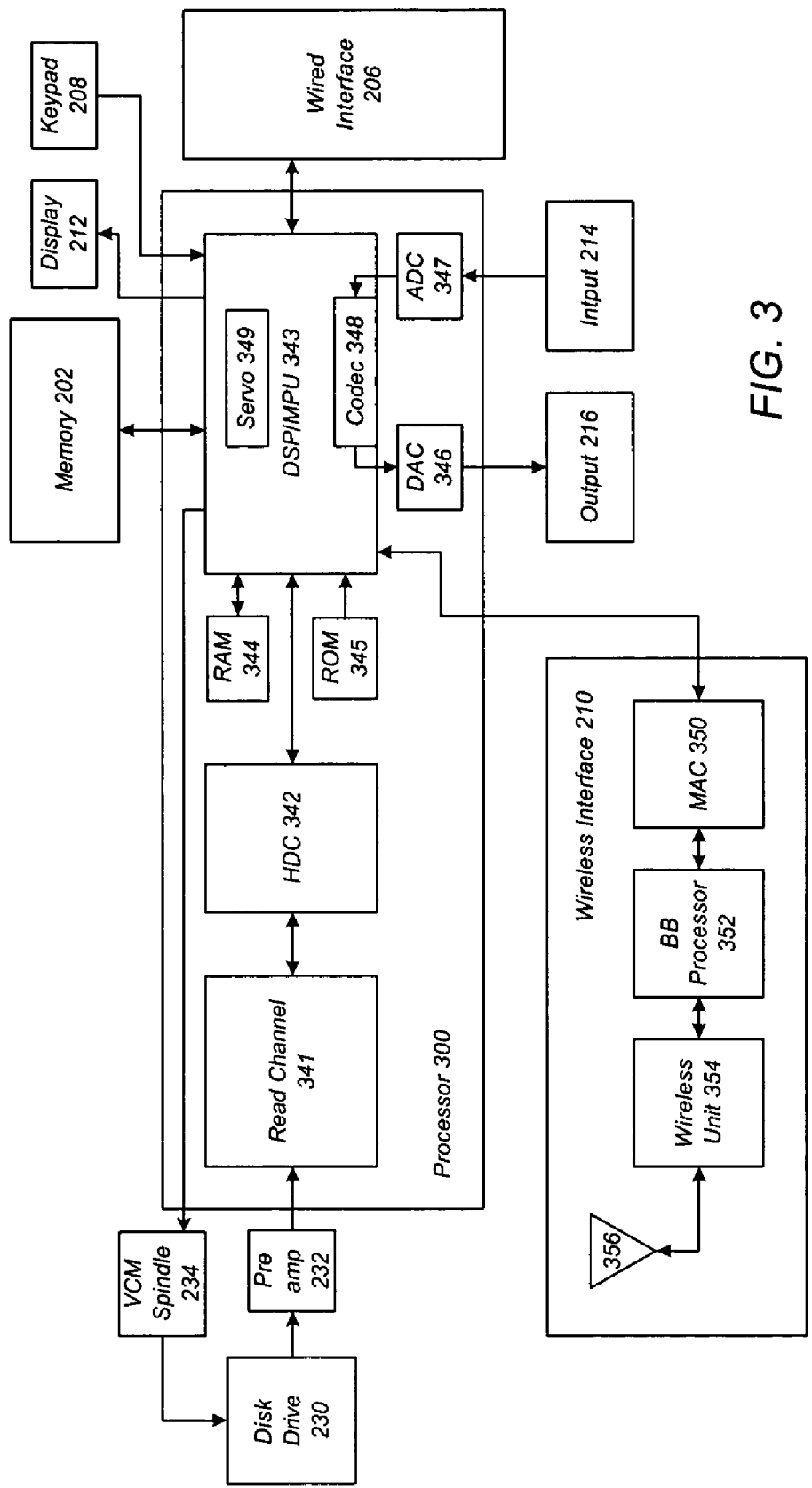
FIG. 3 is a more detailed block diagram of a first embodiment of the media player/recorder of FIG. 2.

FIG. 3 is a detailed block diagram of processor 300. Processor 300 is preferably implemented as a single integrated circuit. A media playback/recorder apparatus having a processor implemented as a single integrated circuit can be fabricated at lower cost and have lower energy consumption. Alternatively, processor 300 may be implemented by discrete components. Processor 300 comprises a read channel 341, storage controller or hard disk controller 342, digital signal processor/microprocessor unit (DSP/MPU) 343, random access memory (RAM) 344, a non volatile memory such as read only memory (ROM) 345, digital to analog converter (DAC) 346 and analog to digital converter (ADC) 347. DSP/MPU 343 comprises servo controller 349 and Codec 348. In a preferred embodiment, DSP/MPU 343 is implemented as a single integrated circuit. In another embodiment, MPU may be implemented as one integrated circuit and the DSP may be implemented as another integrated circuit.

It is noted that DSP/MPU 343 may comprise a microprocessor unit, a digital signal processor, or any combination thereof. ROM 345 stores programmed instructions for processor 300 and DSP/MPU 343 to control the operation of both the disk drive 230 (and associated circuitry) and the signal processing of the media data. RAM 345 is provided as a working memory for DSP/MPU 343. For each of the various compression formats discussed above, the decompression and compression algorithms for Codec 348 are stored on disk drive 230. Storing the decompression and compression algorithms on disk drive 230 minimizes the size of ROM 345 and its energy consumption. Additionally, this feature allows future compression and decompressions formats to be easily implemented for the media player/recorder.

In the implementation of FIG. 3, wireless interface 210 is implemented separately from processor 300, and includes an antenna 356, a wireless unit 354, a baseband processor 352, and a media access controller (MAC) 350. Antenna 356 is a conventional antenna for receiving and transmitting wireless signals. Wireless unit 354 converts wireless signals received by antenna 356 to analog baseband signals, and converts analog baseband signals received from baseband processor 352 to wireless signals for transmission by antenna 356. Baseband processor 352 converts analog baseband signals received from wireless unit 354 to a digital bitstream, and converts a digital bitstream received from MAC 350 to analog baseband signals, both according to well-known methods. MAC 350 frames the digital bitstream produced by baseband processor 352, and filters the frames to select the frames addressed to processor 300, both according to well-known methods. MAC 350 also converts frames received from processor 300 to a digital bitstream for baseband processor 352, also according to well-known methods. In some implementations, MAC 350 includes an embedded microprocessor.

Figure 6:
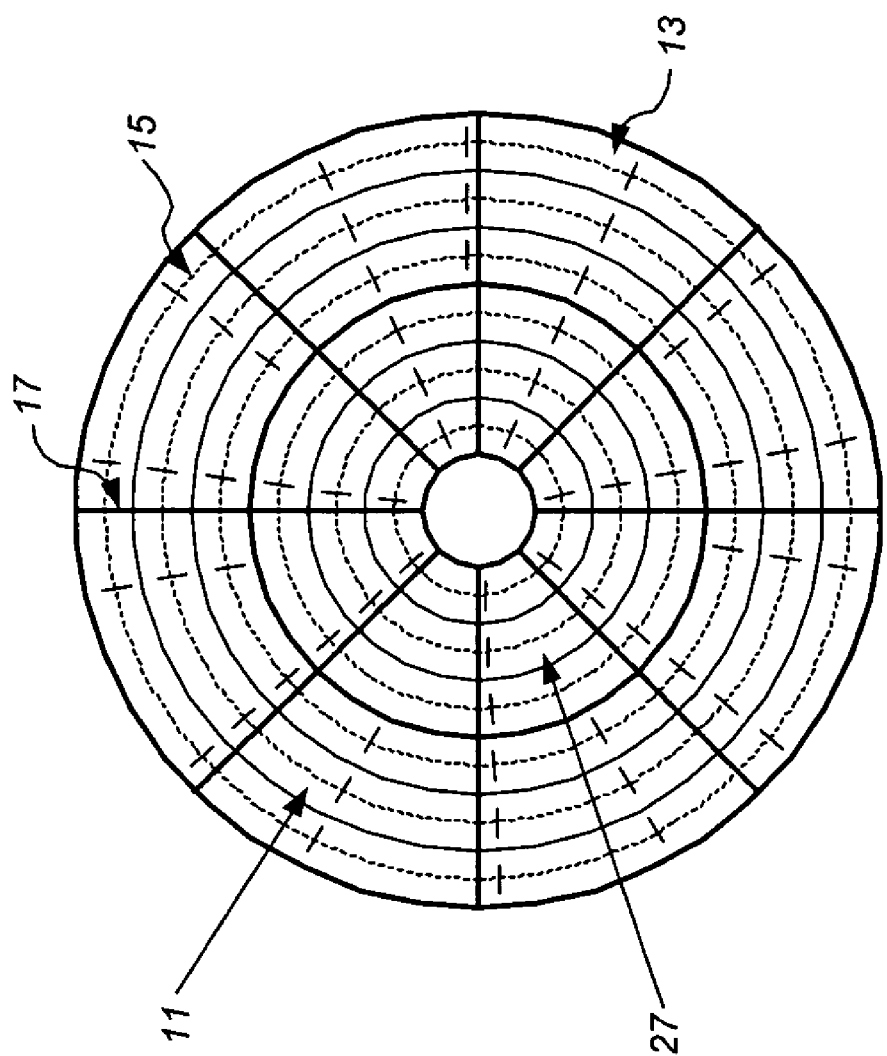
FIG. 6 shows an exemplary data format of a magnetic disk having a plurality of concentric tracks comprised of a plurality of user data sectors and embedded servo data sectors.

Prior to discussing the operation of processor 300, reference is made to FIG. 6. FIG. 6 shows an exemplary data format of a magnetic media used in disk drive 230, comprising a series of concentric data tracks 13 wherein each data track 13 comprises a plurality of sectors 15 with embedded servo wedges 17. Servo controller 349 processes the servo data in servo wedges 17 and, in response thereto, positions the read/write head over a desired track. Additionally, servo controller 349 processes servo bursts within servo wedges 17 to keep a disk head of disk drive 230 aligned over a centerline of the desired track while writing and reading data. Servo wedges 17 may be detected by the discrete time sequence detector implemented in DSP/MPU 343. It is important to note that DSP/MPU 343 is utilized only during the time period for detecting servo wedges 17; during other periods DSP/MPU 343 is available to perform other functions as described below, such as signal processing for media data playback and recording. By using only one DSP rather than two, the cost of fabrication and the amount of energy consumption can be reduced.

As described above, the powering up of the device is done in a sequential manner so as to minimize energy consumption of the device. More specifically, the mechanical or motor portions of the storage device are energized first. After the motor reaches operating speed, VCM 234 is energized, followed by the energization of read channel 341 and HDC 342.

The operation of processor 300 is as follows. DSP/MPU 343 controls the entire operation of the media player/recorder. DSP/MPU 343 is coupled to hard disk controller 342. When writing data to disk drive 230, hard disk controller 342 receives a write instruction and write data from DSP/MPU 343. The write data is temporarily stored in a cache memory (not shown) which is used as a buffer memory. Based on a clock from a clock generator (not shown), DSP/MPU 343 controls voice coil motor (VCM) and spindle motor 234 via servo unit 349. As a result, the magnetic head is moved to a desired track position on the magnetic disk by the head arm, and the magnetic disk is rotated at a rated rotational speed by the spindle, which is driven by spindle motor 234. The data is read from the cache memory and supplied to read channel 341 via hard disk controller 342. Read channel 341 encodes the write data under the control of DSP/MPU 343, and supplies the encoded write data to preamplifier 232. The magnetic head writes the encoded write data on the magnetic disk in accordance with a signal from preamplifier 232.

When reading data from the magnetic disk, hard disk controller 342 receives a read instruction from DSP/MPU 343. Based on a clock signal, DSP/MPU 343 controls voice coil motor and spindle motor 234 via servo unit 349. Hence, the magnetic head is moved to a desired track position on the magnetic disk by the head arm, and the magnetic disk is rotated by spindle motor 234.

The data read from the magnetic disk by the magnetic head is supplied to read channel 341 via preamplifier 232. Read channel 341 decodes the read data under the control of DSP/MPU 343, and generates read data. The read data are supplied from read channel 341 to hard disk controller 342 under the control of DSP/MPU 343, and are temporarily stored in the cache memory. The read data read from the cache memory are supplied to DSP/MPU 343 from hard disk controller 342.

As noted above, operation of the media player/recorder is controlled by the user through keypad 208, which is in communication with DSP/MPU 343. Status of the media player/recorder is provided to the user by display 212 in accordance with DSP/MPU 343. When either uploading or downloading data, the media player/recorder is in communication with personal computer, network appliance, local area network, Internet 50. Otherwise the media player/recorder can be operated independently. The user selects the file to be downloaded from personal computer, network appliance, local area network, Internet 50 by way of keypad 208. Alternatively the user can select the file to be downloaded from the personal computer. DSP/MPU 343 controls the flow of data through interfaces 206 and/or 210 and stores the data onto hard disk 230 in accordance with the method described above. When uploading data to personal computer, network appliance, local area network, Internet 50 the process is reversed.

To record data directly input into media player/recorder from an external analog source, the external device is placed in communication with input 214. Input 214 takes the input signal from the external device and sets the analog signal to an appropriate level. The analog signal is then converted to a digital signal by ADC 347 of processor 300. Codec 348 of DSP/MPU 343 compresses the digitized data using a default compression format or one selected by the user by way of keypad 208. The default or selected compression program is transferred from hard disk 230 to RAM 344 and provided to Codec 348 for encoding. The compressed digital data is similarly stored on disk drive 230 under the control of DSP/MPU 343.

When the user chooses a selection of media data to be played back with keypad 208, DSP/MPU 343 powers up disk drive 230 and retrieves the selected data as described above. The retrieved data is then written to memory 202. After the selected data is stored in memory 202, disk drive 230 is then powered down by DSP/MPU 343. In this manner, during playback disk drive 230 is powered up only during the transfer of the selected media data from disk drive 230 to memory 202, which results in lower energy consumption. A single song stored in MP3 format may take approximately one second to retrieve from disk drive 230. The media data is retrieved from memory 202 by DSP/MPU 343 and the compression format is then determined.

If the decompression program has already been transferred to RAM 344, the program is provided to Codec 348. Otherwise the decompression algorithm is retrieved from hard disk 230 and transferred to RAM 344. The data is then decompressed by Codec 348 and converted to an analog signal by DAC 346. The analog signal is set to an appropriate level by output circuit 216. If the analog signal contains audio data, output circuit 216 is connected to a speaker, headphone and the like for playback, and if the analog signal contains video data, output circuit 216 is connected to a display device for playback.

It is noted that the capacity of disk drive 230 is selected to hold a desired amount of media data, and the amount of solid state memory 202 is selected to minimize energy consumption. A disk drive having a capacity of 1 Gbyte can store approximately 30 hours of MP3 compressed music.

This section will described the power management control of the device by CPU/MPU 343.

Figure 7:
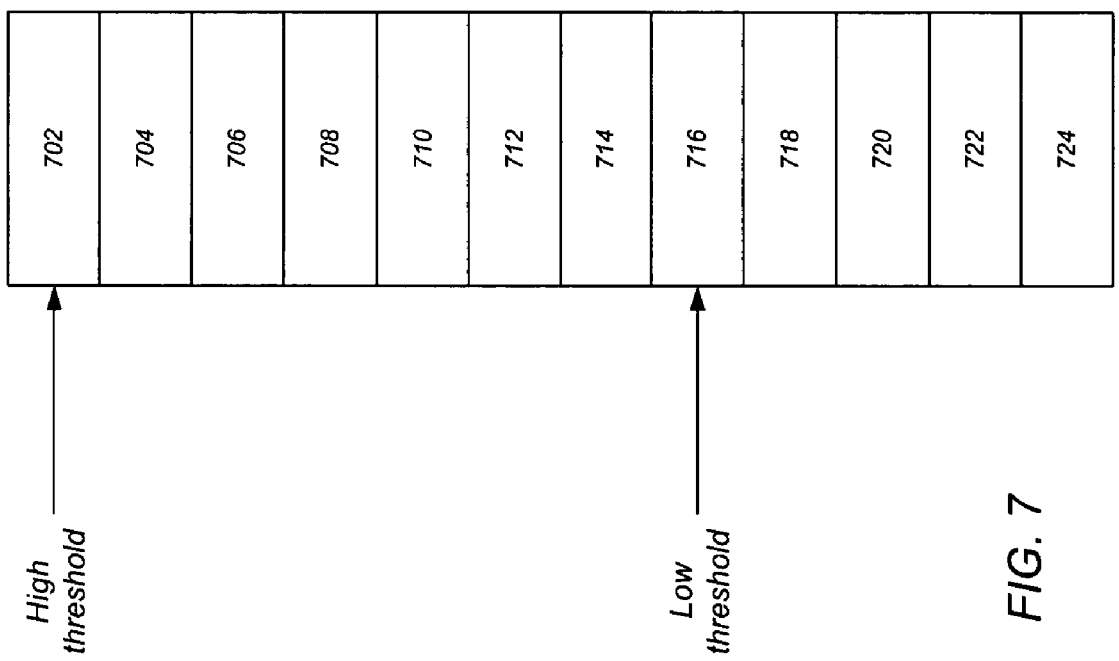
FIG. 7 is a schematic representation of memory 202.
Figure 9:
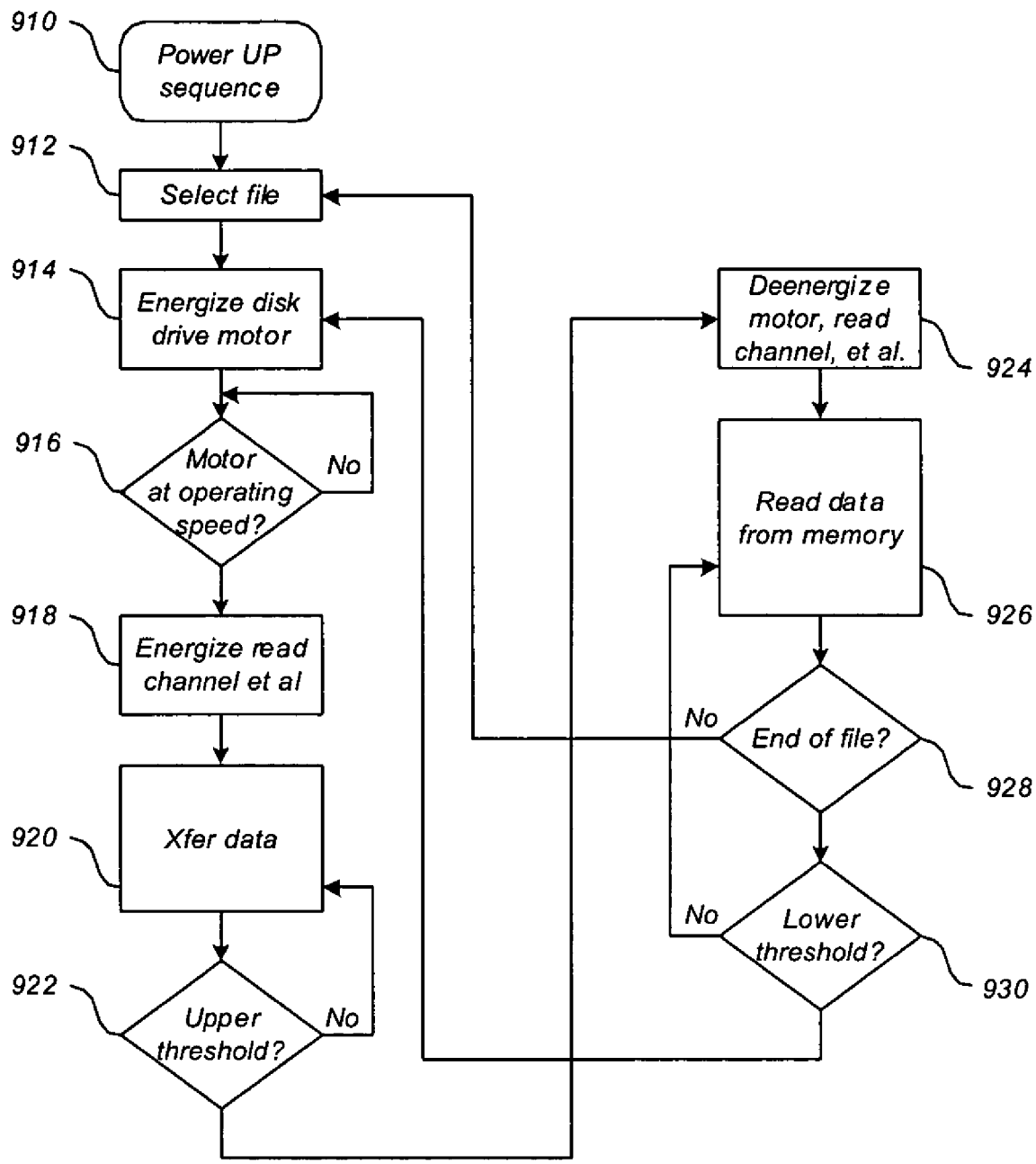
FIG. 9 is flow chart of an energization/deenergization procedure according to a first embodiment of the present invention.

Referring now to FIGS. 3, 7 and 9, when the user turns on the media player and selects a file to be played (step 912), the various components of media player are powered up in a sequential manner so as to minimize energy consumption of the device. More specifically, the mechanical or motor portions of the storage device or disk drive 230 are energized first (step 914). After the motor reaches its operating speed (step 916), VCM 234, preamp 232, read channel 341 and HDC 342 are energized, since these components are only functional after disk drive 230 becomes operational. Energy would be unnecessarily expended if preamp 232, read channel 341 and HDC 342 were energized before disk drive 230 becomes operational. Therefore, VCM 234, preamp 232, read channel 341 and HDC 342 are energized only after disk drive 230 becomes operational (step 918). Preamp 232, read channel 341 and HDC 342 can be referred to as a storage circuit and include circuits to transform data stored on a storage device to a digital signal.

FIG. 7 is a schematic representation of memory 202. User data is first stored from location 724 to location 702 in a sequential manner in memory 202. In one embodiment, DSP/MPU 343 uses a pointer system in connection with memory 202 to determine when the amount of data stored the amount data stored reaches an upper threshold value (step 922). When the amount of data stored in memory 202 reaches the upper threshold value, HDC 342, read channel 341, preamp 232, disk drive 230 and VCM 234 are powered down or deenergized (step 924). Of course, as will be appreciated by one of ordinary skill in the art, while data is being to memory 202, data may also be read contemporaneously therefrom by DSP/MPU 343 for decompression and playback. Data is then read out from memory 202 starting at location 702 towards location 724 by DSP/MPU 343 (step 926). When the data file has been completely read from memory (step 928), the user can select another file. The data is continually read from memory 202, until the amount of data remaining is below a low threshold value (step 930). When the data remaining in memory 202 is below the threshold value, disk drive 230, VCM 234, preamp 232, read channel 341 and HDC 342 are sequentially energized as noted above, and data is transferred from the storage device to memory 202.

Figure 10:
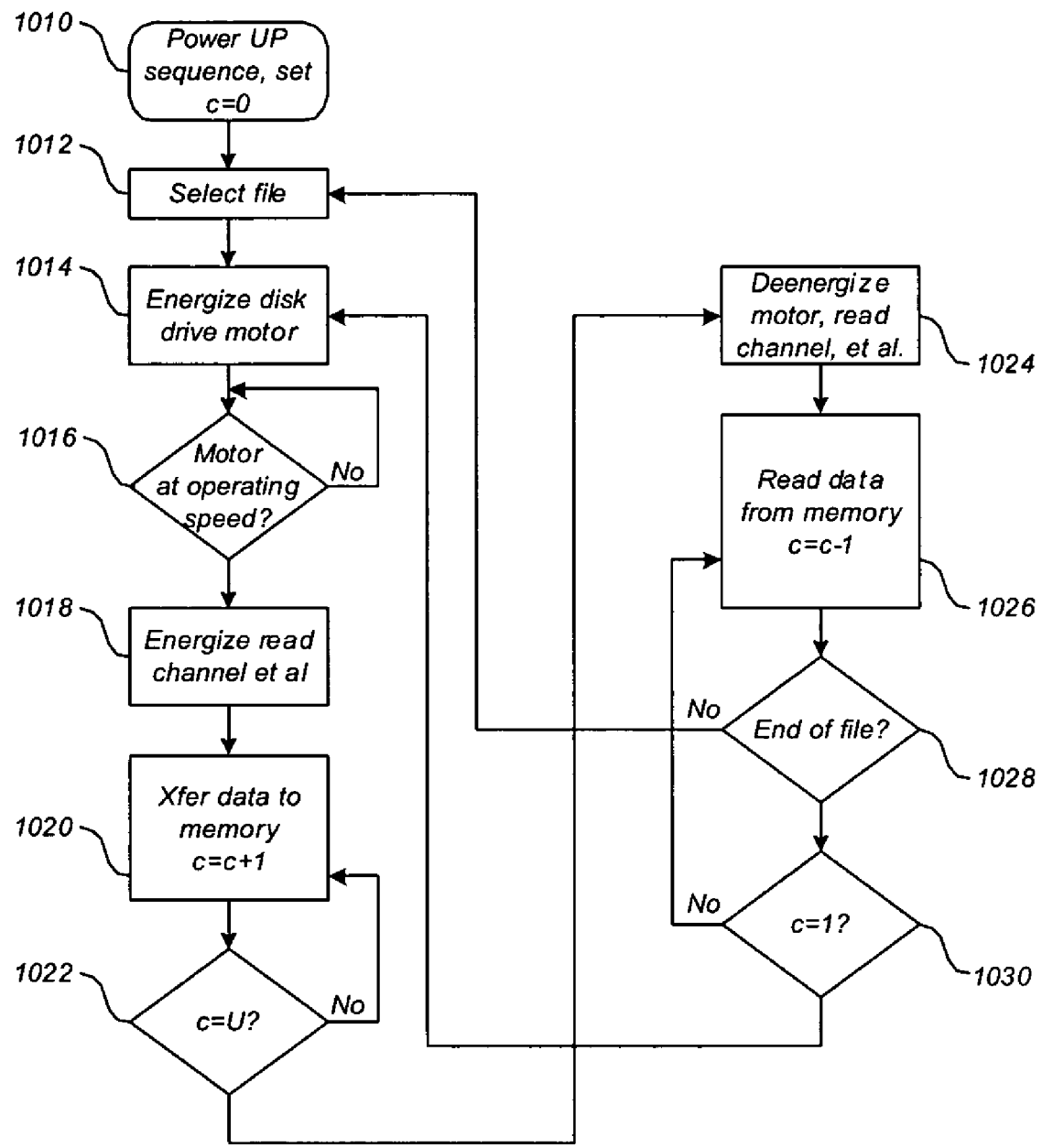
FIG. 10 is flow chart of an energization/deenergization procedure according to a second embodiment of the present invention.

FIG. 10 is an alternate embodiment to FIG. 9. Instead of utilizing a pointer system, the amount of data transferred to memory 202 is counted (step 1020) by a counter incorporated in DSP/MPU 343. The sequential energization of the disk drive 230, VCM 234, preamp 232, read channel 341 and HDC 342 is similar to that of the embodiment of FIG. 9 (steps 1012, 1014, 1016 and 1018). When amount of data transfer to memory 202 is greater than or equal to an upper limit U (step 1022), HDC 342, read channel 341, preamp 232, disk drive 230 and VCM 234 are powered down or deenergized (step 1024). As data is read from memory, the counter decrements the count, and when the count is less than or equal to a lower limit 1 (step 1030), disk drive 230, VCM 234, preamp 232, read channel 341 and HDC 342 are sequentially energized as noted above, and data is transferred from the storage device to memory 202.

Figure 11:
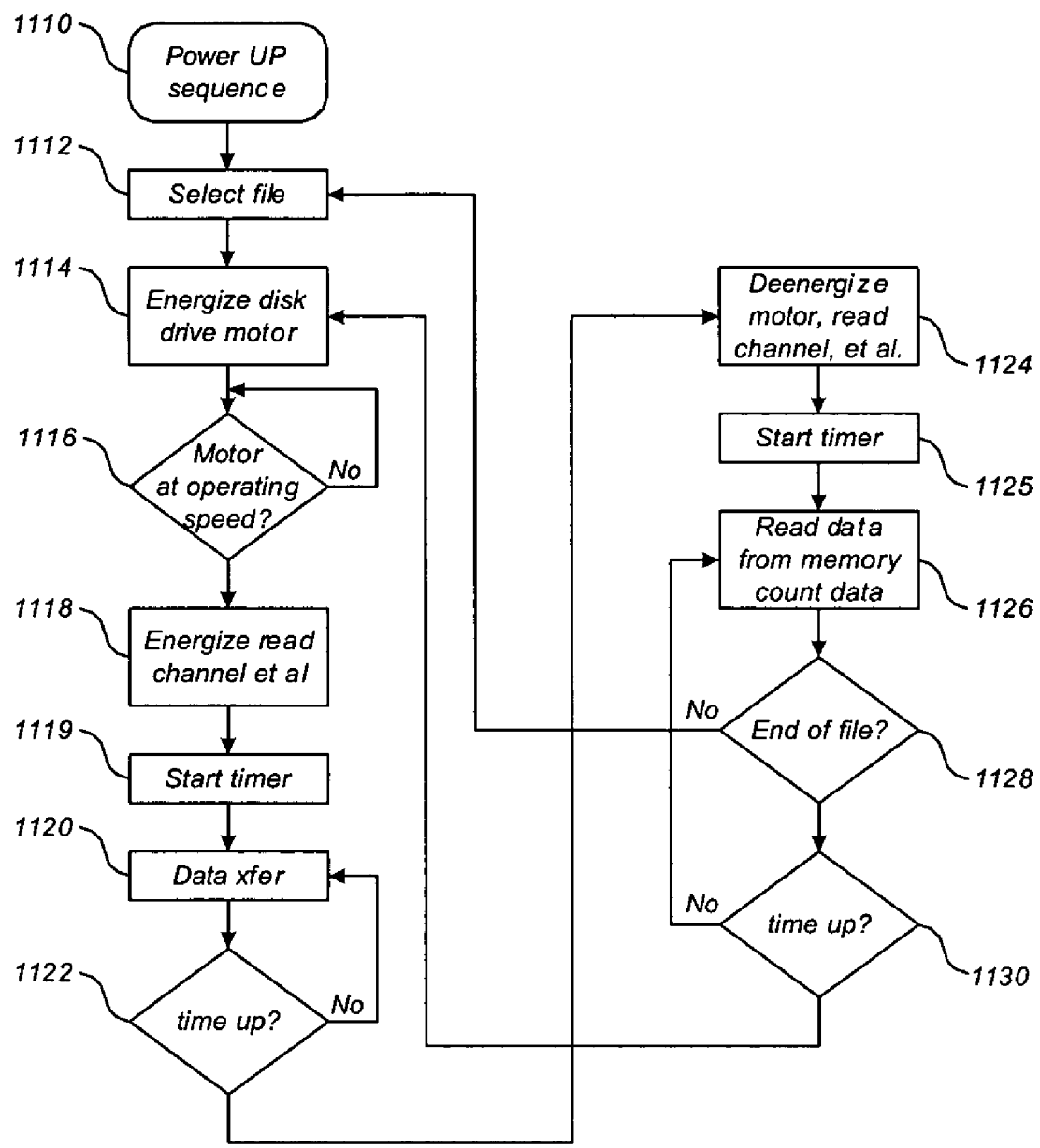
FIG. 11 is flow chart of an energization/deenergization procedure according to a third embodiment of the present invention.

FIG. 11 is another alternate embodiment to FIG. 9. The embodiment in FIG. 9 utilizes a timer incorporated in DSP/MPU 343 to approximate the amount of data transferred to memory 202 in accordance with the data transfer rate of disk drive 230. The sequential energization of disk drive 230, VCM 234, preamp 232, read channel 341 and HDC 342 is similar to that of the embodiment of FIG. 9 (steps 1112, 1114, 1116 and 1118). The timer is started (step 1119) as data is transferred form disk drive 230 to memory 202. When the timer times out, HDC 342, read channel 341, preamp 232, disk drive 230 and VCM 234 are powered down or deenergized (step 1124). As data is read from memory, the timer is started (1125), and when the timer times out (step 1130), disk drive 230, VCM 234, preamp 232, read channel 341 and HDC 342 are sequentially energized as noted above, and data is transferred from the storage device to memory 202.

Figure 8:
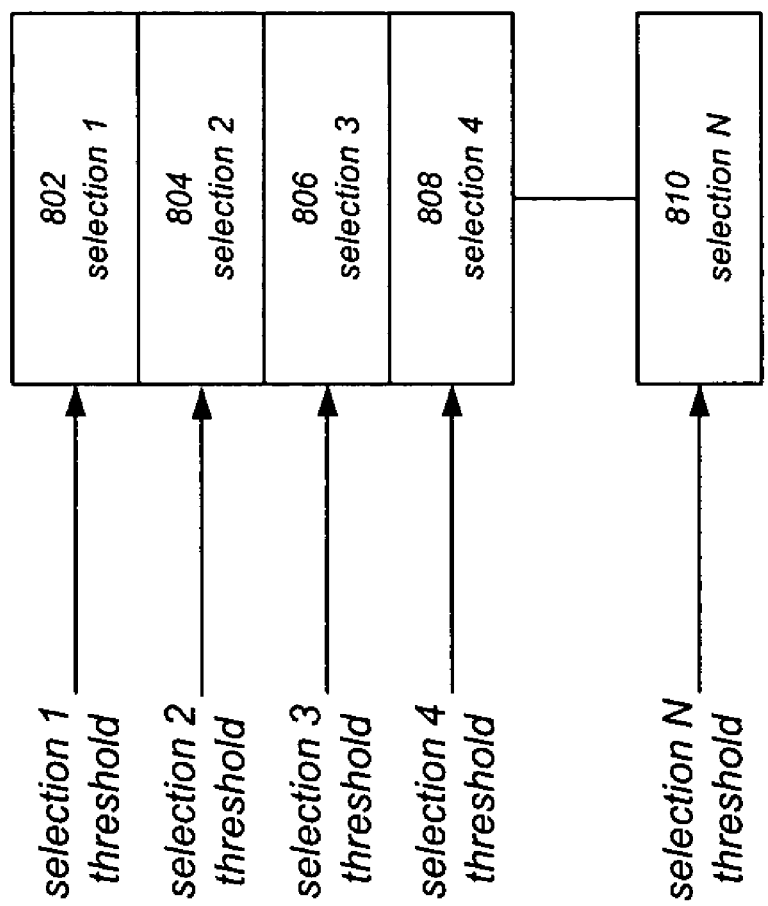
FIG. 8 is a memory map of memory 202.
Figure 12:
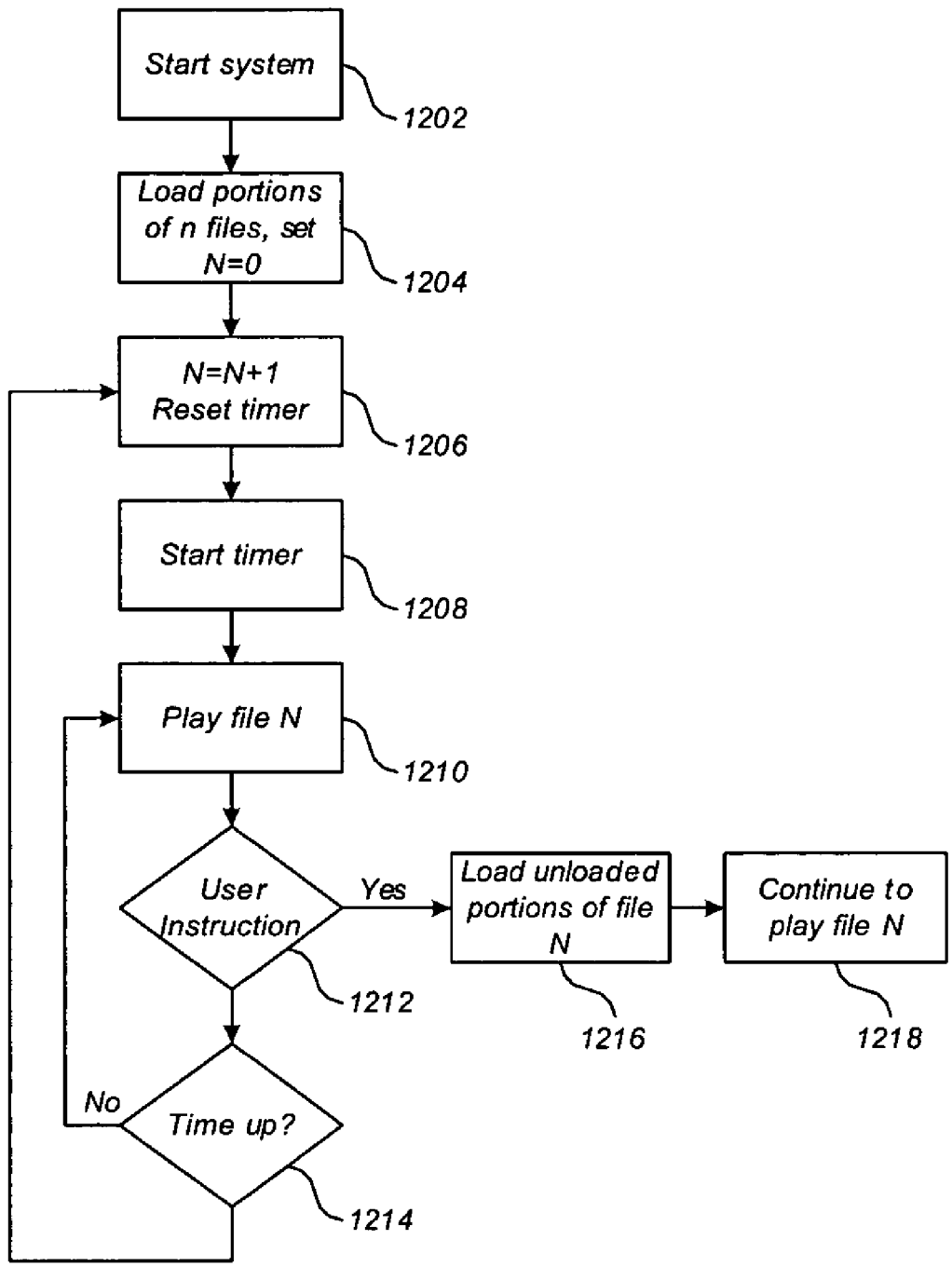
FIG. 12 is flow chart of an operating procedure according to the present invention.

In the simplest implementation, media data representing one selection (such as a single song) is transferred from disk drive 230 to memory 202 for playback. FIG. 8 is a schematic representation of memory 202, and FIG. 12 is a flow chart illustrating an alternate implementation. As shown therein, instead of retrieving just one selection, first portions of multiple selections are transferred from disk drive 230 to memory 202. These multiple selections may include the user's favorite selections, random selections from an external source, or the like (step 1204). When the user starts playing back the selection, a timer is started (step 1208) and the first selection is played back (step 1210). If a user instruction is received (step 1212) to continue playing that selection is received within a predetermined time (step 1214), the remaining portion of the selection is transferred from disk drive 230 to memory 202 (step 1216) for continued play back (step 1218). If the timer times out (step 1214), the first portion of the next selection (step 1206) is played back and the process is repeated for each remaining first portion. Alternatively, instead of using a timer, a memory threshold, as shown in FIG. 8, may be utilized permit playback of the entire current selection if the user instruction is received before the memory being read out goes below the current selection threshold. Otherwise the first portion of the next selection is played back. Of course, the play back of portions of selections 1 through N may be in any order, such as sequential, random and predetermined. If the play back is in sequential order new selections may be transferred from disk drive 230 to memory 202 to replace previously played back selections.

Figure 4:
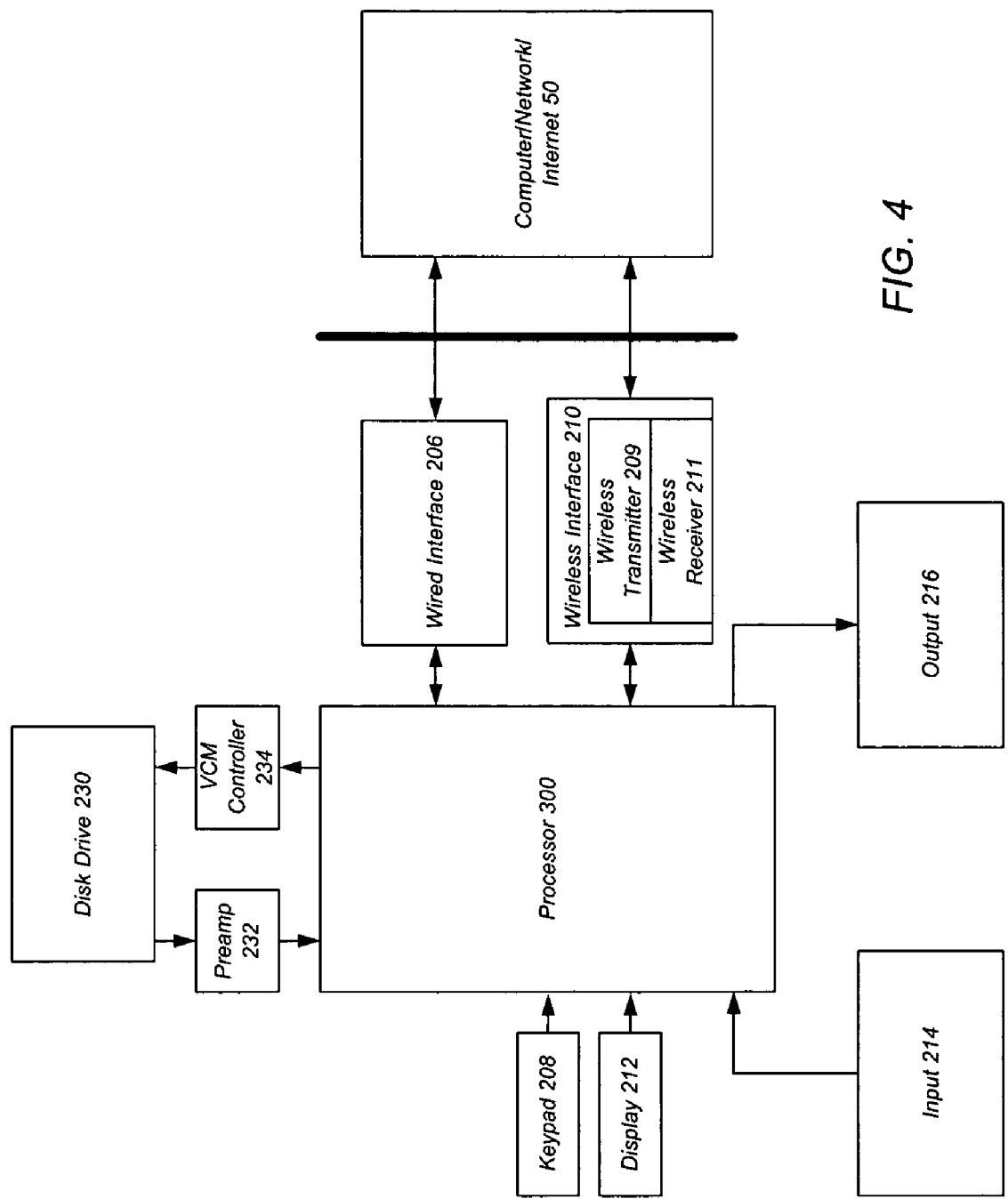
FIG. 4 is a block diagram of a second embodiment of a media player/recorder in accordance with the present invention.
Figure 5:
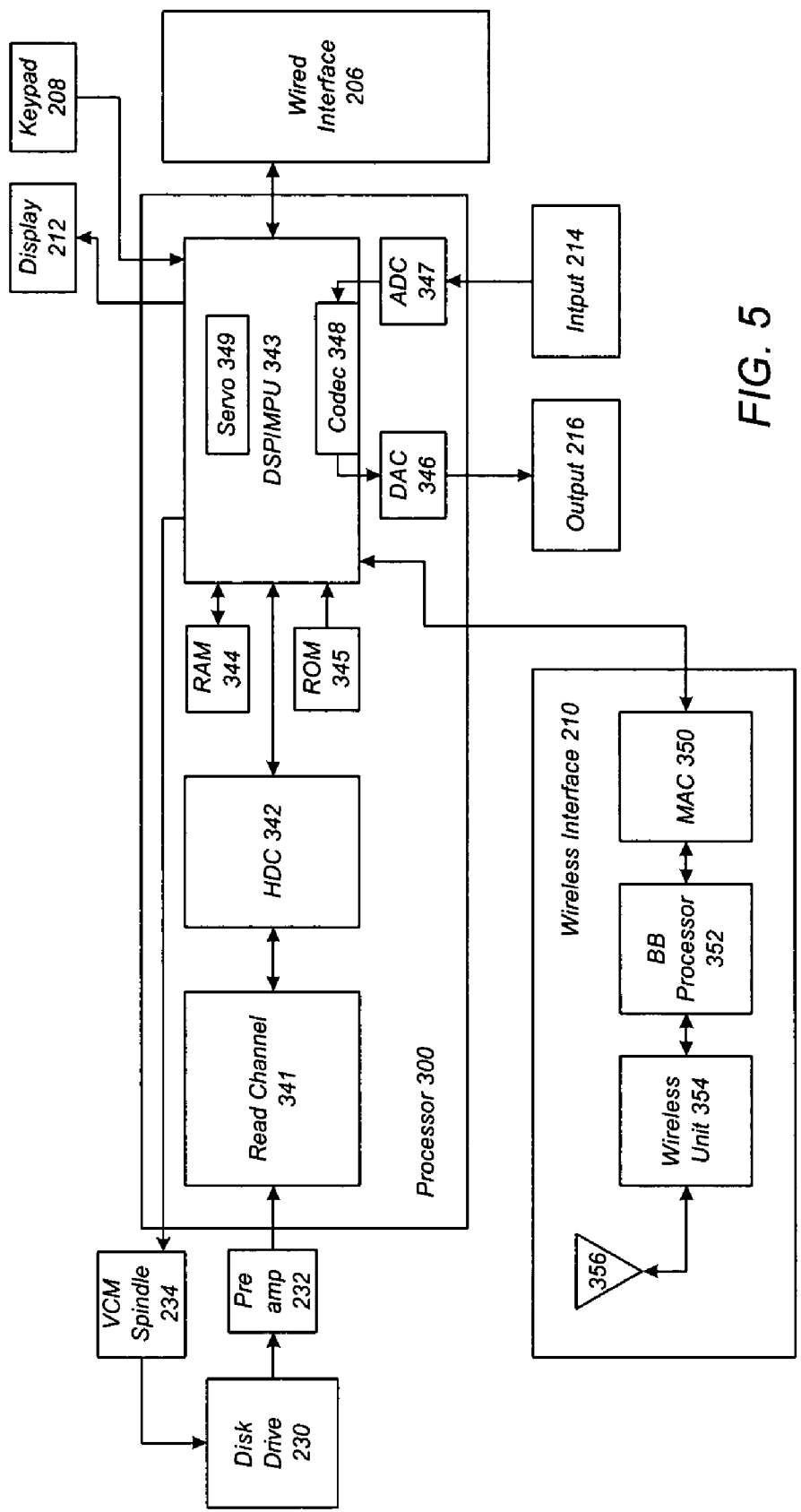
FIG. 5 is a more detailed block diagram of the media player/recorder of FIG. 4.

FIGS. 4 and 5 show a second embodiment of the present invention. The second embodiment is similar to the first embodiment except the second embodiment does not include memory 202. In this embodiment media data is recorded in a similar manner as the first embodiment and no further discussion is provided herein. For playback operation, the media data is retrieved directly from disk drive 230 for playback through output 216. The other portions of the playback operation are similar to the first embodiment. In the second embodiment disk drive 230 will be powered on any time media data is recorded or played back. As such this embodiment is particularly applicable when the power supply is external. For example the media player/recorder of the second embodiment may be a portable device used in an automobile supply by energy therefrom. In some implementations, MAC 350 includes an embedded microprocessor.

Figure 13:
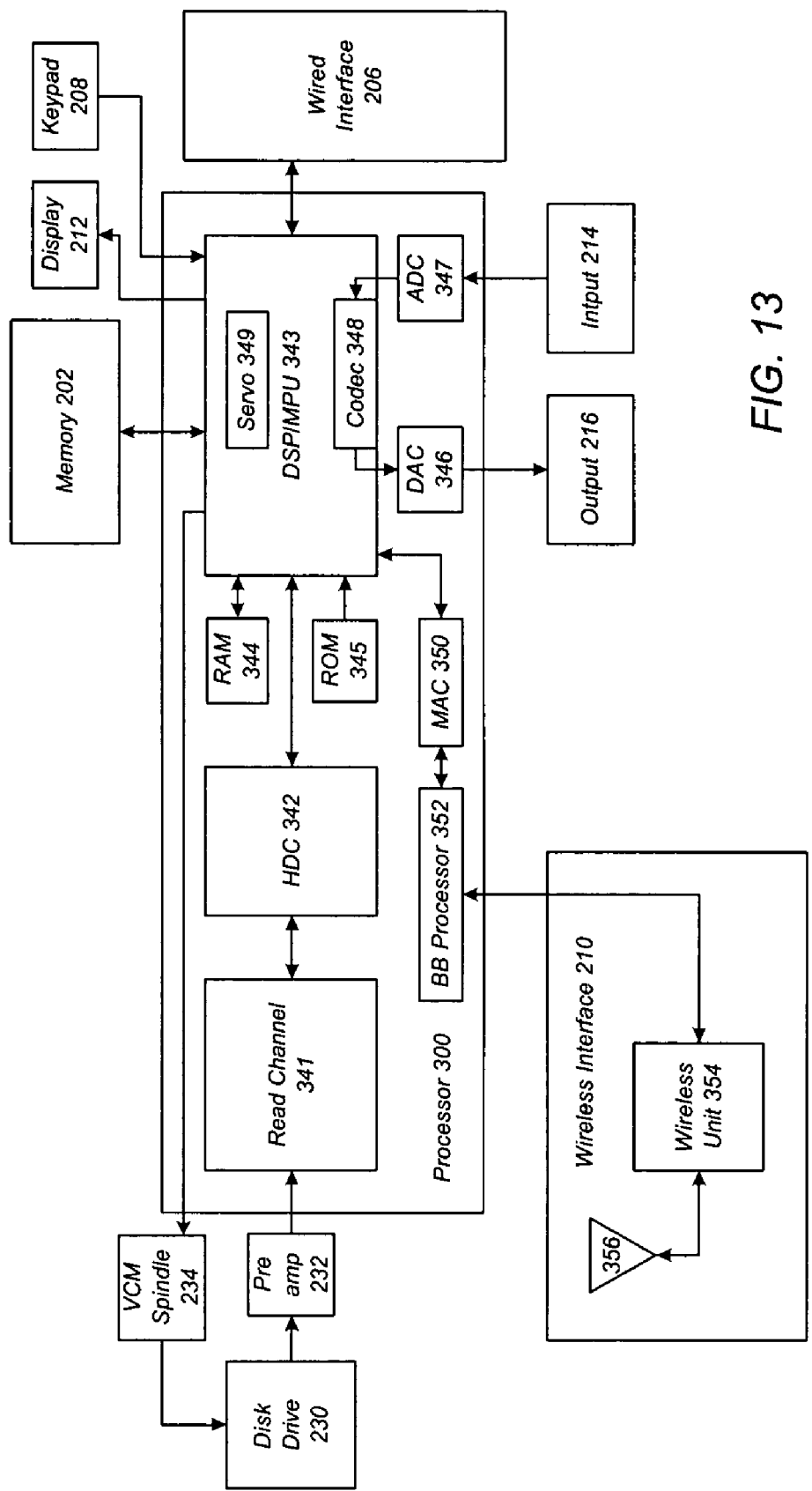
FIG. 13 shows a variation of the first embodiment of the media player/recorder of FIG. 2.

FIG. 13 shows a variation of the first embodiment. According to this variation, baseband processor 352 and MAC 350 are implemented within processor 300, preferably as a single integrated circuit. Wireless interface 210 includes antenna 356 and wireless unit 354. This variation operates as described for the first embodiment. In some implementations, MAC 350 includes an embedded microprocessor.

Figure 14:
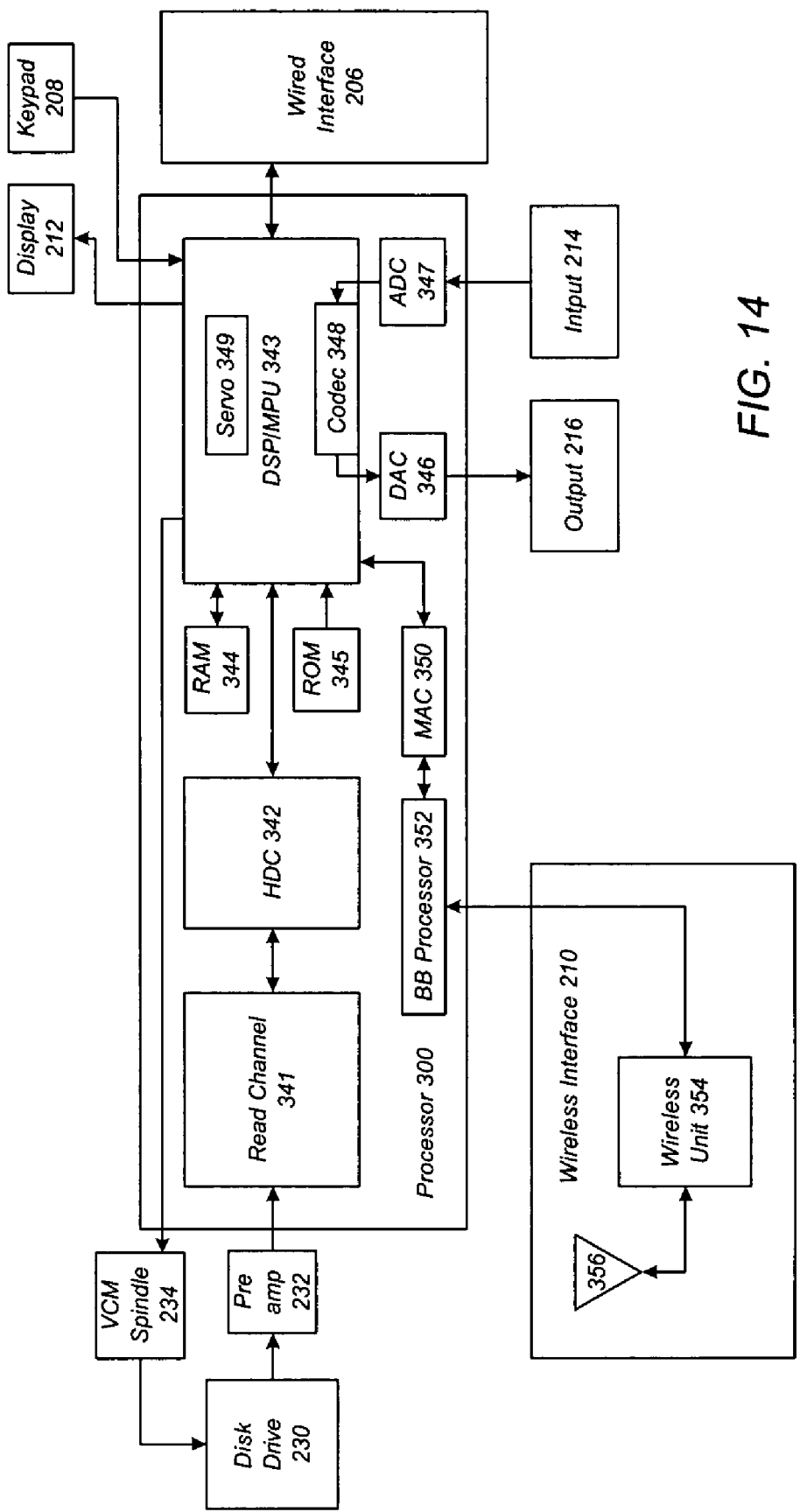
FIG. 14 shows a variation of the second embodiment of the media player/recorder of FIG. 2.

FIG. 14 shows a variation of the second embodiment. According to this variation, baseband processor 352 and MAC 350 are implemented within processor 300, preferably as a single integrated circuit. Wireless interface 210 includes antenna 356 and wireless unit 354. This variation operates as described for the first embodiment. In some implementations, MAC 350 includes an embedded microprocessor.

Figure 15:
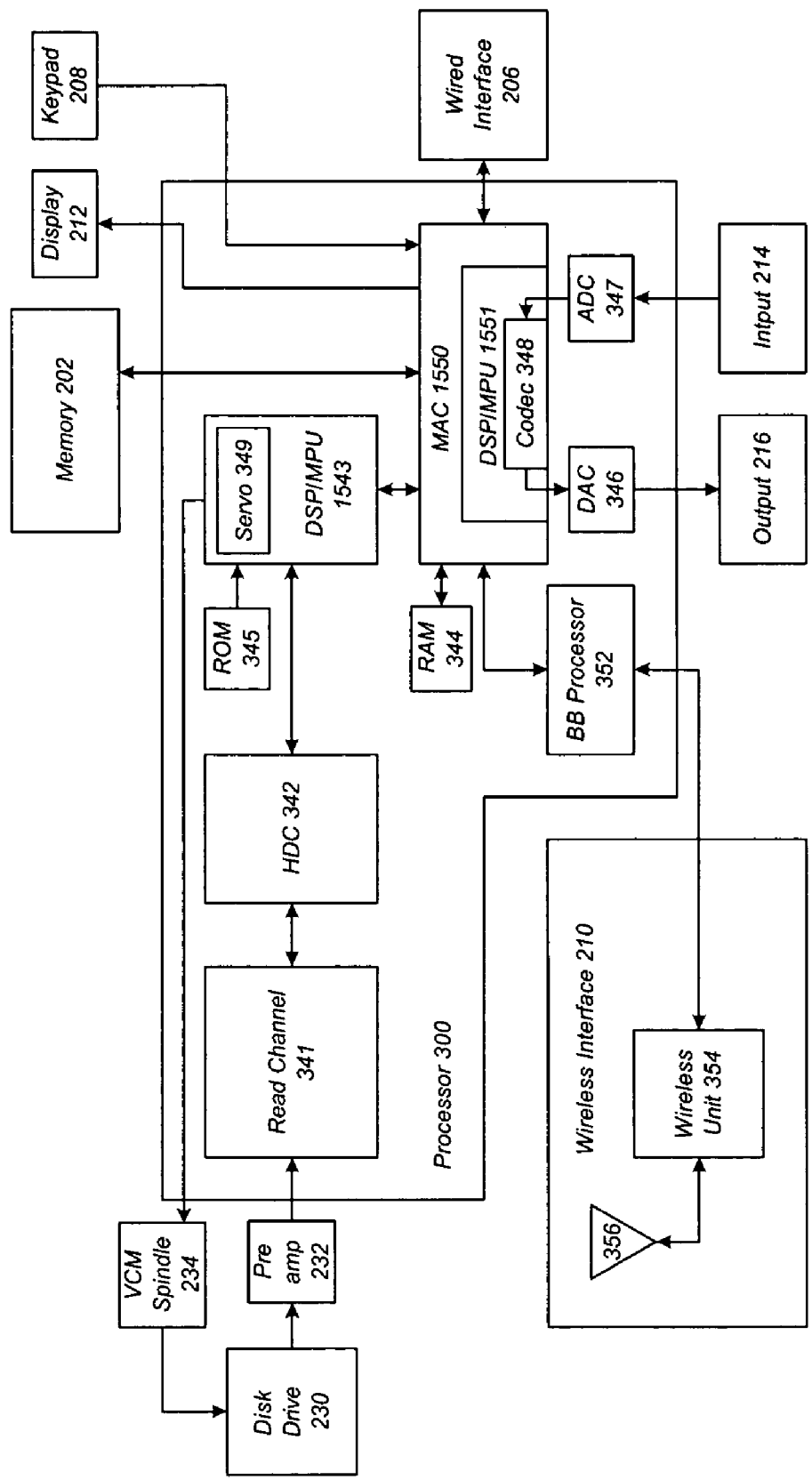
FIG. 15 is a block diagram of a third embodiment of a media player/recorder in accordance with the present invention.

FIG. 15 is a block diagram of a third embodiment of a media player/recorder in accordance with the present invention. According to this embodiment, a MAC 1550 is implemented within processor 300, which is preferably implemented as a single integrated circuit, and includes an embedded digital signal processor and microprocessor unit (DSP/MPU) 1551. DSP/MPU 1551 includes codec 348, and communicates with memory 202, display 212, keypad 208, wired interface 206, RAM 344, DAC 346, and ADC 347, which function as described above with reference to FIG. 3. DSP/MPU 343 has been replaces with DSP/MPU 1543, which controls disk drive 230, read channel 341, and HDC 342 as described above.

Figure 16:
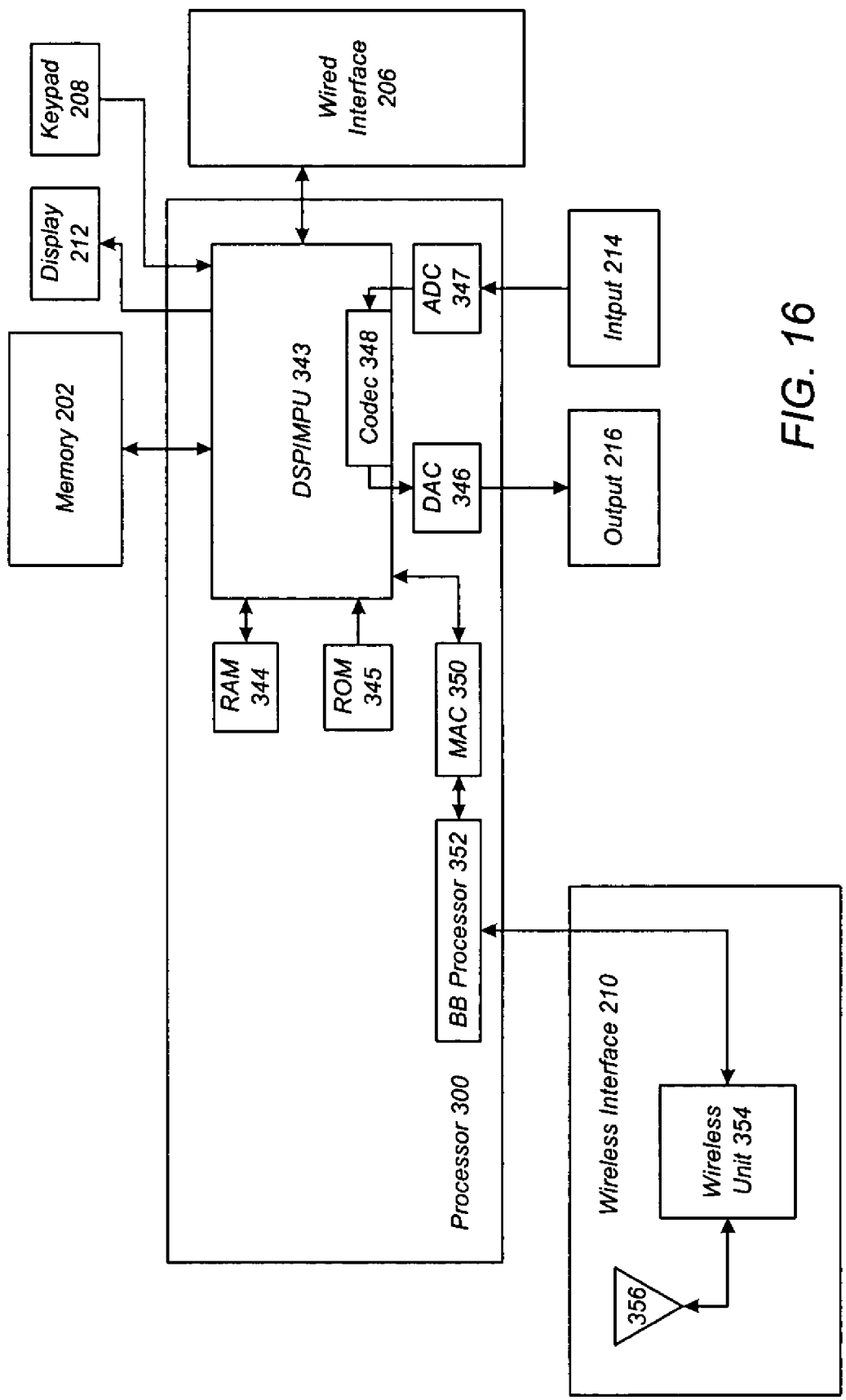
FIG. 16 is a block diagram of a fourth embodiment of a media player/recorder in accordance with the present invention.

FIG. 16 is a block diagram of a fourth embodiment of a media player/recorder in accordance with the present invention. This embodiment is similar to the above embodiments, but has no hard drive. Some implementations of this embodiment optionally include a non-volatile memory 202 such as a flash memory instead of a hard drive. Consequently the circuits associated with the hard drive are also eliminated, resulting in a less-expensive media player/recorder. In the depicted implementation, baseband processor 352 and MAC 350 are implemented within processor 300, which is preferably implemented as a single integrated circuit. In other implementations, baseband processor 352 and MAC 350 are implemented separately from processor 300, for example, within wireless interface 210. In some implementations, MAC 350 includes an embedded DSP/MPU. These implementations operate in a manner similar to that described for the implementations of FIG. 15.

The implementations using non-volatile memory instead of a hard drive are especially useful for receiving streaming media from broadcasts such as internet radio stations and other media player recorders. Some implementations feature a "broadcast" mode where the media player/recorder plays a media selection and wirelessly transmits the media selection, either compressed or uncompressed, or in analog form, such that other media player/recorders can receive the broadcast media and play it at the same time as the broadcasting player/recorder.

Figure 17:
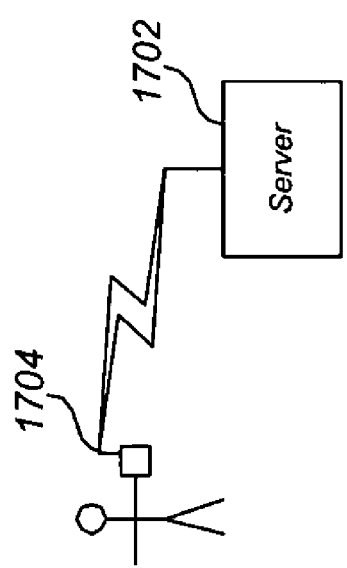
FIG. 17 illustrates a mode of some implementations referred to as "local radio mode."

The implementations with no hard drive or non-volatile memory are especially useful in a "local radio" mode where the media to be played is stored on a personal computer, server, or the like that is separate from the media player/recorder. FIG. 17 illustrates the local radio mode. In this mode, the media is wirelessly streamed to the media player/recorder 1704, which decompresses and plays the media without storing the media. Because the media player/recorder never stores a copy of the media, it is ideal for playing media for which only a single copy is licensed. The single copy is stored on a personal computer (PC) 1702, and is streamed to media player/recorder 1704 for playback. Because only a single copy of the media is stored, the single-copy license is satisfied.

Figure 18:
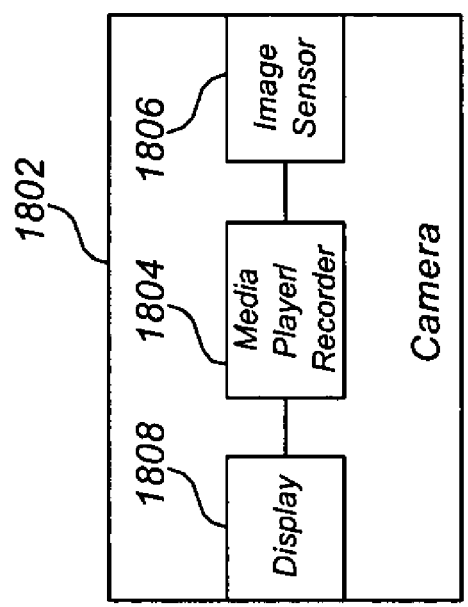
FIG. 18 shows an implementation where a media player/recorder is implemented within a digital camera.

FIG. 18 shows an implementation where a media player/recorder 1804 is implemented within a digital camera 1802. In recording mode, an image sensor 1806 within camera 1802 captures one or more images, and passes a signal representing the image to media player/recorder 1804. If the signal is analog, a analog-to-digital converter within media player/recorder 1804 converts the analog signal to a digital signal. A digital signal processor within media player/recorder 1804 then encodes the digital signal. The encoding can include image compression, image manipulation, and the like. A storage controller within media player/recorder 1804 stores the encoded image data on a storage device. In some implementations, digital camera 1802 is a digital motion picture camera and the encoded image data represents a motion picture.

Figure 19:
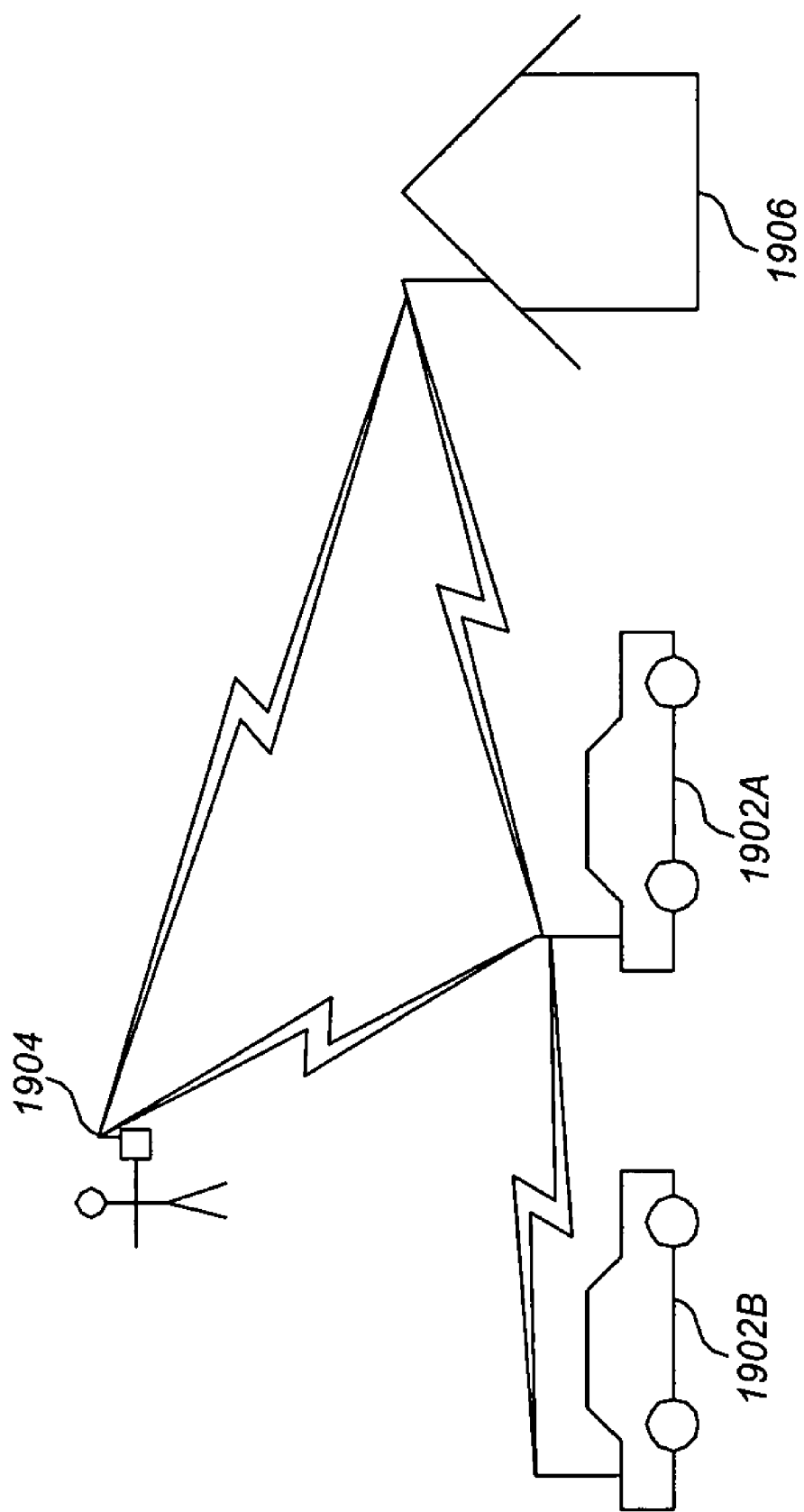
FIG. 19 shows automobiles equipped with a media player/recorder in accordance with the present invention.

In playback mode, the storage controller retrieves the encoded image data from the storage device. The digital signal processor decodes the retrieved encoded image data. Media player/recorder 1804 sends a signal representing the decoded image data to a display 1808, which displays the image(s) captured by image sensor 1806.A The media player/recorder described herein can be implemented as a portable unit, as a permanently mounted unit within a vehicle such as an automobile, and the like. FIG. 19 shows automobiles 1902A and 1902B equipped with such a media player/recorder. In this implementation, the antenna of the automobile can serve as the antenna of the media player/recorder. The media player/recorders in the automobiles 1902 can communicate with each other, without user intervention, while traveling near each other, while stopped at intersections, and in other similar scenarios, to share media data, items of interest, and the like. The media player/recorders in the automobiles 1902 can also communicate with portable media player/recorders 1904 in a similar fashion. The vehicular and portable media player/recorders can communicate with a stationary base station 1906 to share media over a network such as the Internet. For example, a homeowner can equip his garage with such a base station 1906 so the media player/recorder in his automobile can share media and items of interest while parked in the garage during the night. Similarly, a user of a portable player/recorder 1904 can equip his home with a base station 1906 so the media player/recorder 1904 can share media and items of interest while not otherwise in use, for example while the user sleeps.

Some implementations receive and store data other than media data. In some implementations the media player/recorder records biometric data collected by a biometric sensor disposed near, upon, or within a human body or other organism. The biometric data can represent biological functions such as breathing, heart function, body temperature, blood pressure, and the like. Such devices and methods are well-known in the relevant arts, and are described in U.S. Pat. No. 6,023,662 entitled "Measurement Device, Portable Electronic Instrument, And Measurement Method," issued Feb. 8, 2000; U.S. Pat. No. 6,030,342 entitled "Device For Measuring Calorie Expenditure And Device For Measuring Body Temperature," issued Feb. 29, 2000; U.S. Pat. No. 6,036,653 entitled "Pulsimeter," issued Mar. 14, 2000; and U.S. Pat. No. 6,081,742 entitled "Organism State Measuring Device and Relaxation Instructing Device," issued Jun. 27, 2000, the disclosures thereof incorporated by reference herein in their entirety.

Figure 21:
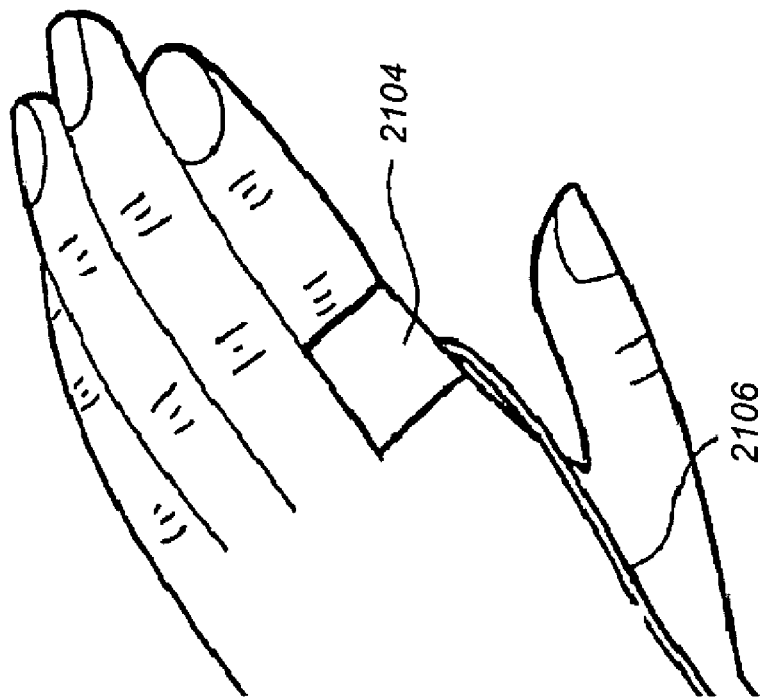
FIG. 21 show a biometric sensor worn on a finger and transmitting biometric data over a cable.
Figure 20:
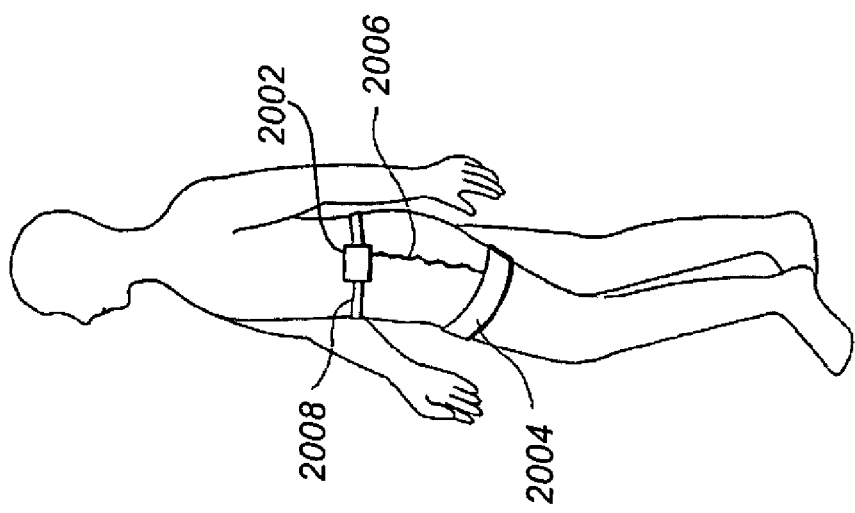
FIG. 20 shows an implementation where a media player/recorder communicates with a biometric sensor over a cable.

FIG. 20 shows an implementation where a media player/recorder 2002 communicates with a biometric sensor 2004 over a cable 2006. The biometric data collected by biometric sensor 2004 is passed to media player/recorder 2002 over cable 2006. Alternatively, the biometric data can be passed to media/player recorder 2002 wirelessly. The data can be passed in analog or digital form, and is received and stored by media/player recorder 2002 according to the methods described above. In FIG. 20 the biometric sensor is worn on the leg. Of course, the biometric sensor can be worn in other locations. FIG. 21 show a biometric sensor 2104 worn on a finger and transmitting biometric data over a cable 2106.

According to these implementations, a user of the media player/recorder can record biometric data for later use in diagnosis and treatment of intermittently occurring medical conditions such as heart arrhythmia. When the user subsequently visits a doctor, the media player/recorder can transmit the stored biometric data to the doctor's computer for analysis, by wire or wirelessly.

Figure 22:
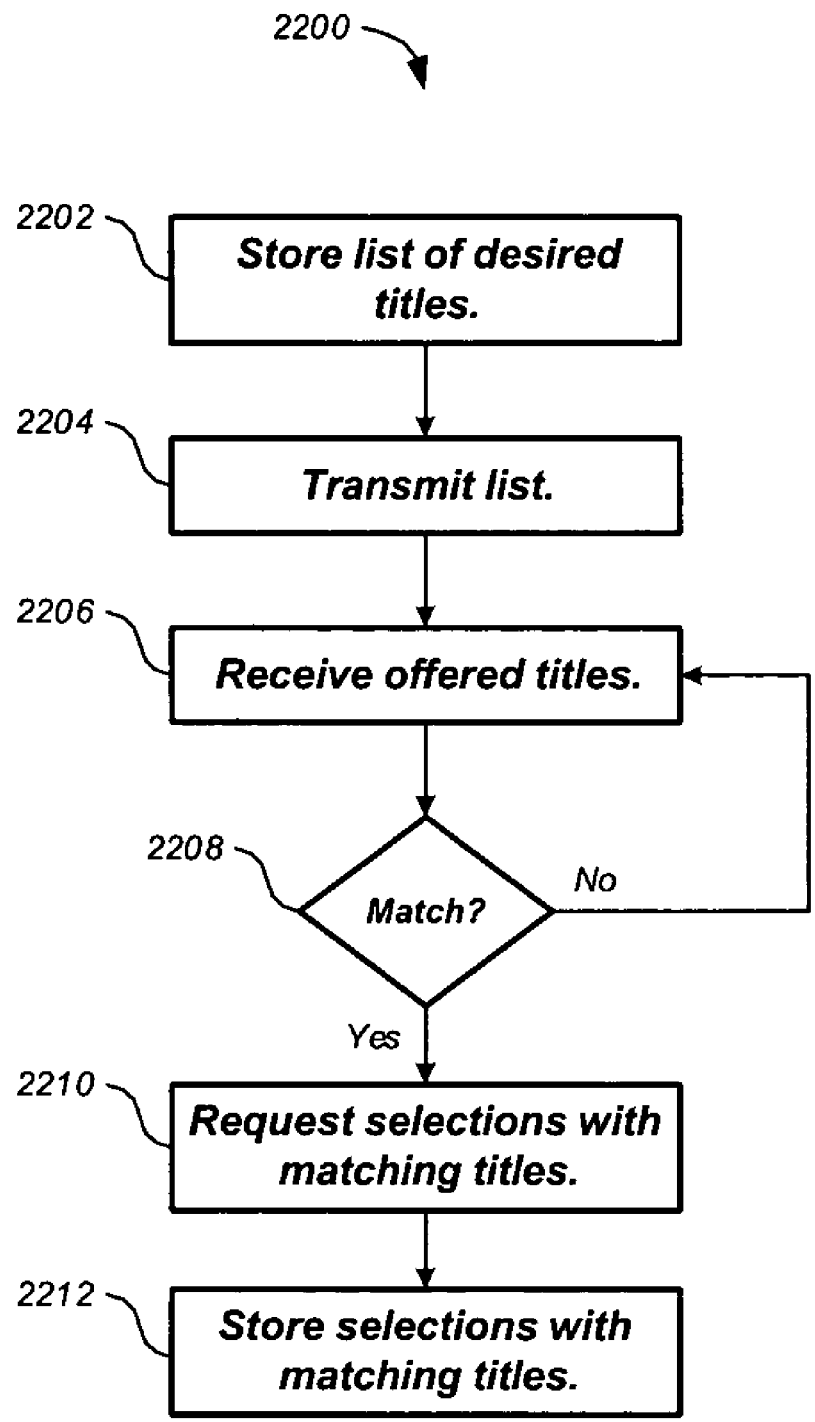
FIG. 22 shows a process for a media player/recorder to acquire shared media.
Figure 23:
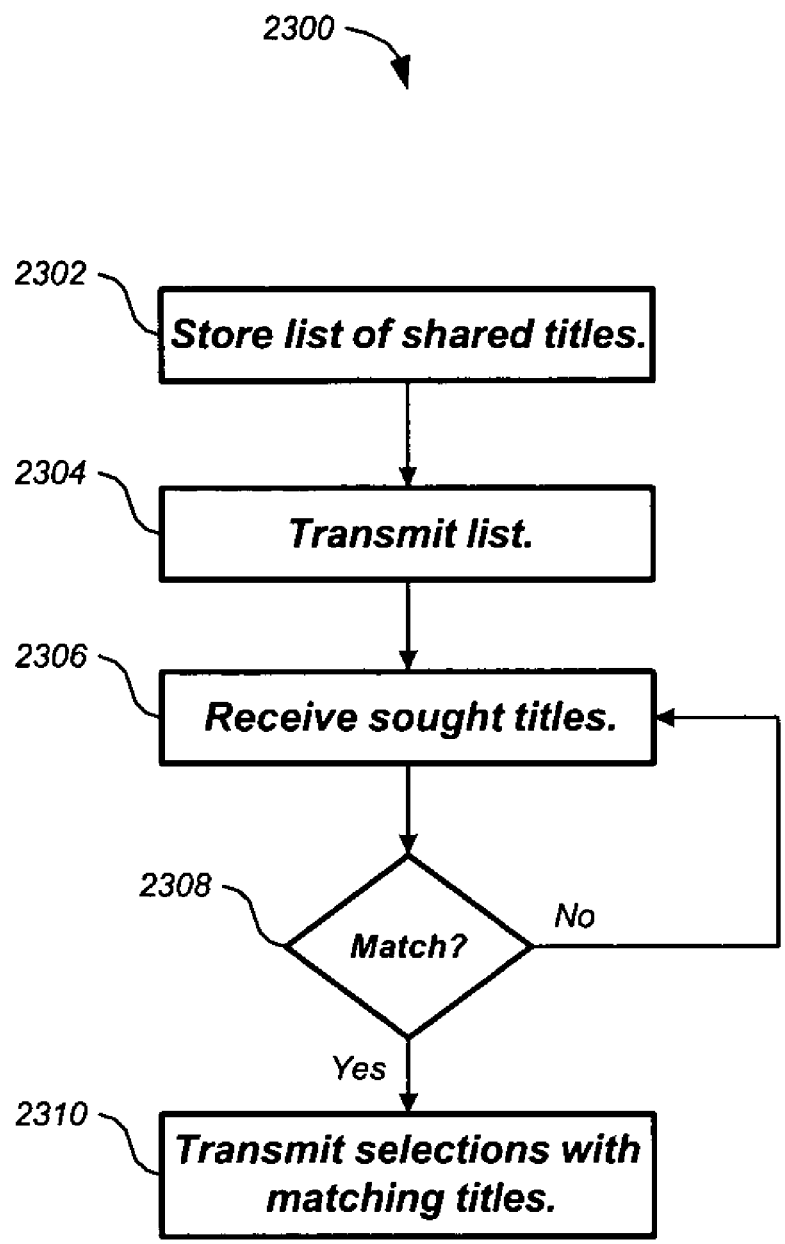
FIG. 23 shows a process for a media player/recorder to share media.

Some implementations feature a "share" mode in which media stored on one media player/recorder can be shared with other media player recorders using wireless data transmissions over wireless interface 210. FIGS. 22 and 23 show methods for such sharing. Of course, media can be shared over wired interface 206 as well using similar methods. However, these methods are well-suited for the relatively lower data rates of wireless links because they require little user intervention. These methods can be used not only to share media between player/recorder units, but also with other repositories of media, such as remote network servers and the like.

FIG. 22 shows a process 2200 for a media player/recorder to acquire shared media. A list of identifiers of desired media selections, such as song titles, is stored within the player/recorder (step 2202). A user can generate the list using the keypad, download the list from a computer, or the like. Optionally, the wireless transmitter can transmit a signal representing the list (step 2204). Other player/recorder units receive the list, and respond by offering media selections on the list. The wireless receiver receives the titles of the offered media selections (step 2206). The offered titles are compared to the desired titles (step 2208). The player/recorder optionally transmits a signal requesting the selections having matching titles (step 2210). Other player/recorders respond by transmitting the requested selections. The player/recorder receives the requested selections, and stores the received selections (step 2212).

The player/recorder can obtain selections shared by a broadcaster that simply transmits a title of a media selection, and then transmits the selection, without first waiting to receive lists of desired titles or requests for media selections having matching titles. In this case optional steps 2204 and 2210 are not needed.

FIG. 23 shows a process 2300 for a media player/recorder to share media. A list of identifiers of shared media selections, such as song titles, is stored within the player/recorder (step 2302). A user can generate the list using the keypad, download the list from a computer, or the like. Optionally, the wireless transmitter can transmit a signal representing the list (step 2304). Other player/recorder units receive the list, and respond by requesting media selections on the list. The wireless receiver receives the titles of the sought media selections (step 2306). The sought titles are compared to the shared titles (step 2308). The player/recorder transmits the selections having matching titles (step 2310).

Figure 24:
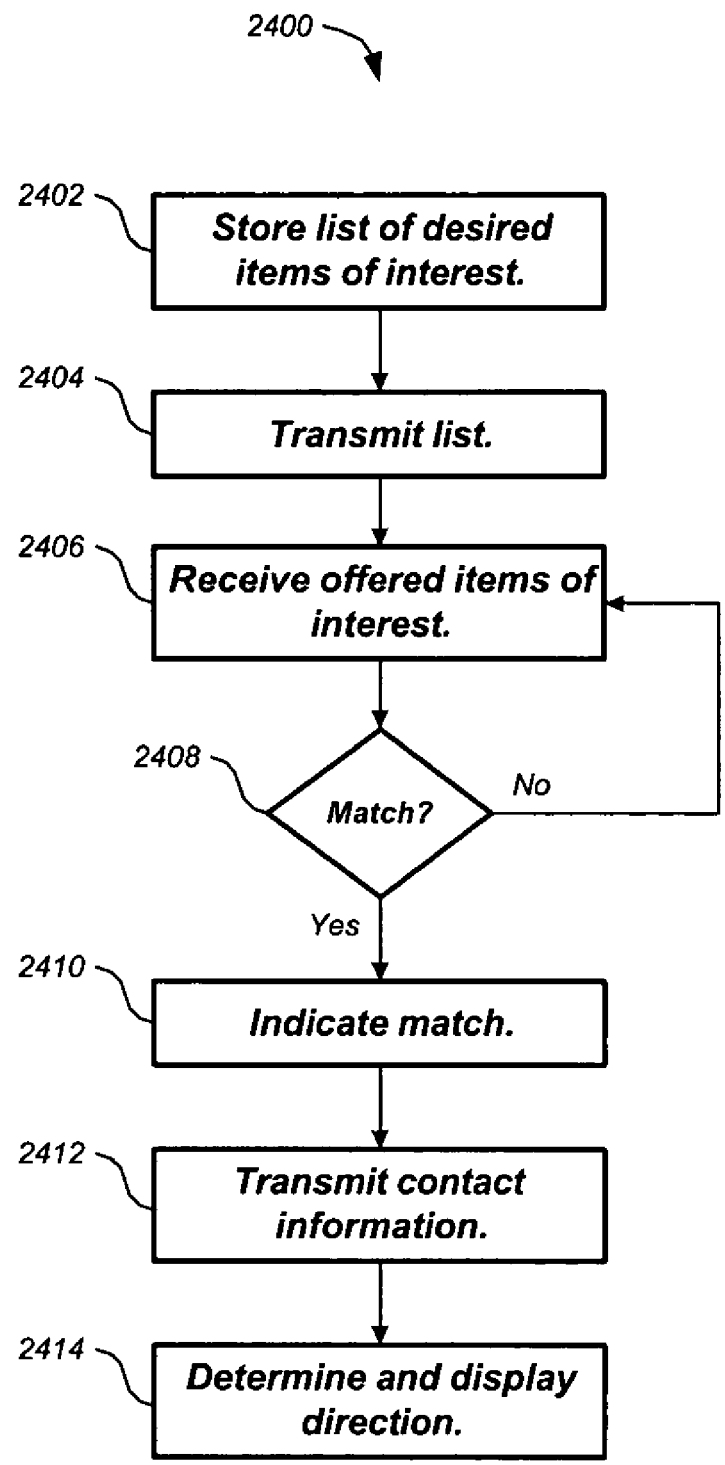
FIG. 24 shows a process for a media player/recorder to match items of interest.

Some implementations feature an "interest matching" mode in which items of interest stored on one media player/recorder can be shared with other media player recorders using wireless data transmissions over wireless interface 220. Items of interest include interests such as hobbies and sports, items for sale or rent, requests for items for sale or rent, musical preferences and the like. When a match is made, the display units indicate the match, and the media player/recorders can wirelessly exchange contact information such as email addresses, telephone numbers and the like. Some implementations include a directional antenna to allow the users having matched items of interest to locate each other. Of course, interests can be matched over wired interface 216 as well using similar methods. FIG. 24 shows methods for such interest matching.

FIG. 24 shows a process 2400 for a media player/recorder to match items of interest. A list of desired items of interest is stored within the player/recorder (step 2402). A user can generate the list using the keypad, download the list from a computer, or the like. Optionally, the wireless transmitter can transmit a signal representing the list (step 2404). The wireless receiver receives offered items of interest from other player/recorders (step 2406). The offered items of interest are compared to the desired items of interest (step 2408). When compared items of interest match, the display unit indicates a match (step 2410). Optionally the player/recorder transmits contact information to the transmitter of the offered item of interest (step 2412). Optionally, the player/recorder determines and displays a direction to the transmitter of the offered item of interest (step 2414). The player/recorder can also include a range finder circuit to determine a range to the transmitter of the offered item of interest, which is then displayed.

Figure 25:
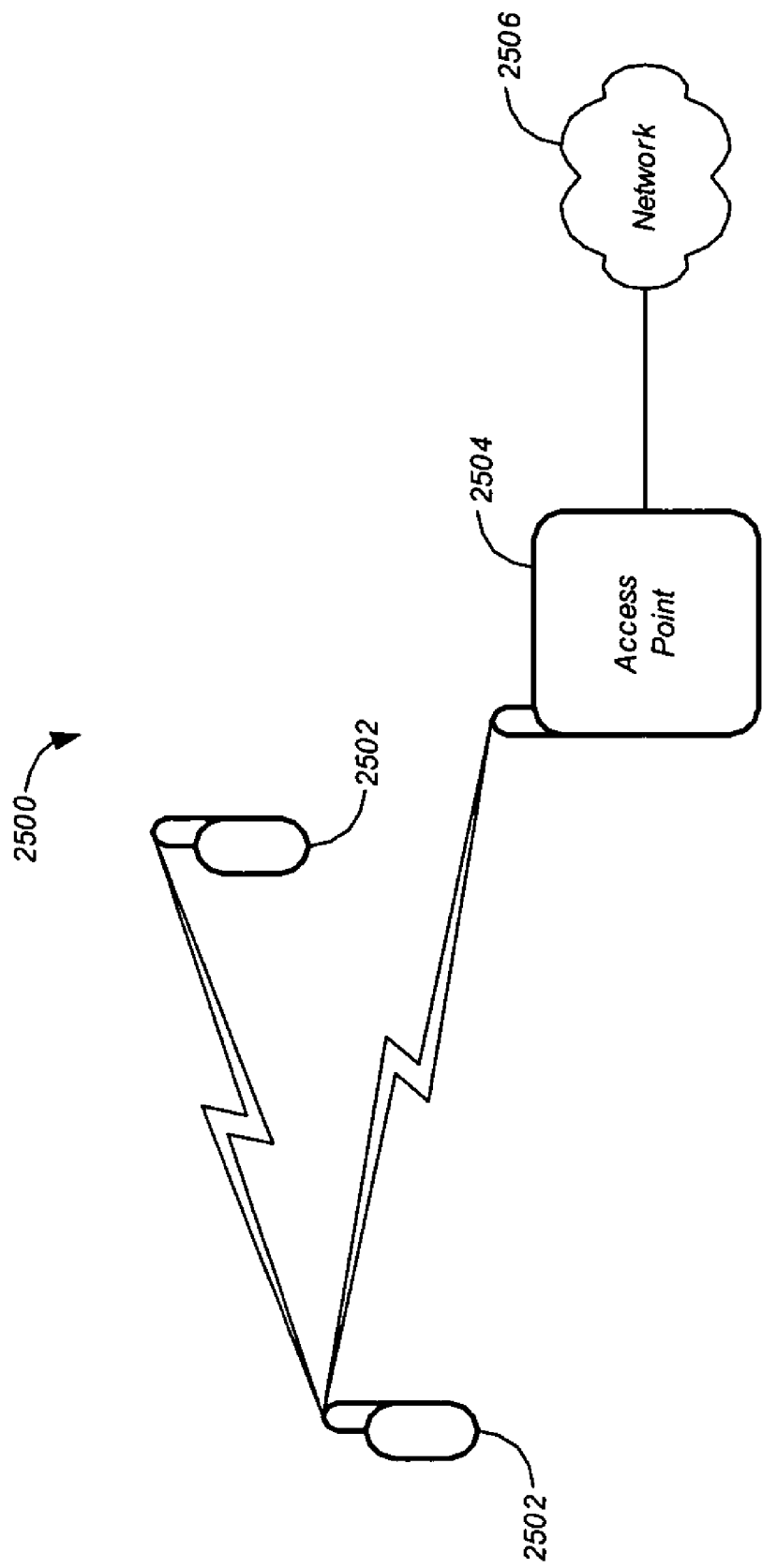
FIG. 25 shows an intercom system according to a preferred embodiment.

FIG. 25 shows an intercom system 2500 according to a preferred embodiment. Intercom system 2500 comprises one or more intercoms 2502, which can be portable or fixed, for example in the walls of a home, much like a conventional intercom system. The fixed intercoms 2502 can be wired or wireless, while portable intercoms 2502 are preferably wireless.

In ad hoc implementations, intercoms 2502 detect and communicate with each other directly. Infrastructure implementations comprise an optional access point 2504 with which intercoms 2502 communicate. Intercoms 2502 can be dedicated to an ad hoc implementation or to an infrastructure implementation, or can be configurable to operate with either implementation. In some infrastructure implementations, access point 2504 can communicate with other devices and networks 2506, such as the Internet, a local area network, a personal computer, or any other network device.

Figure 26:
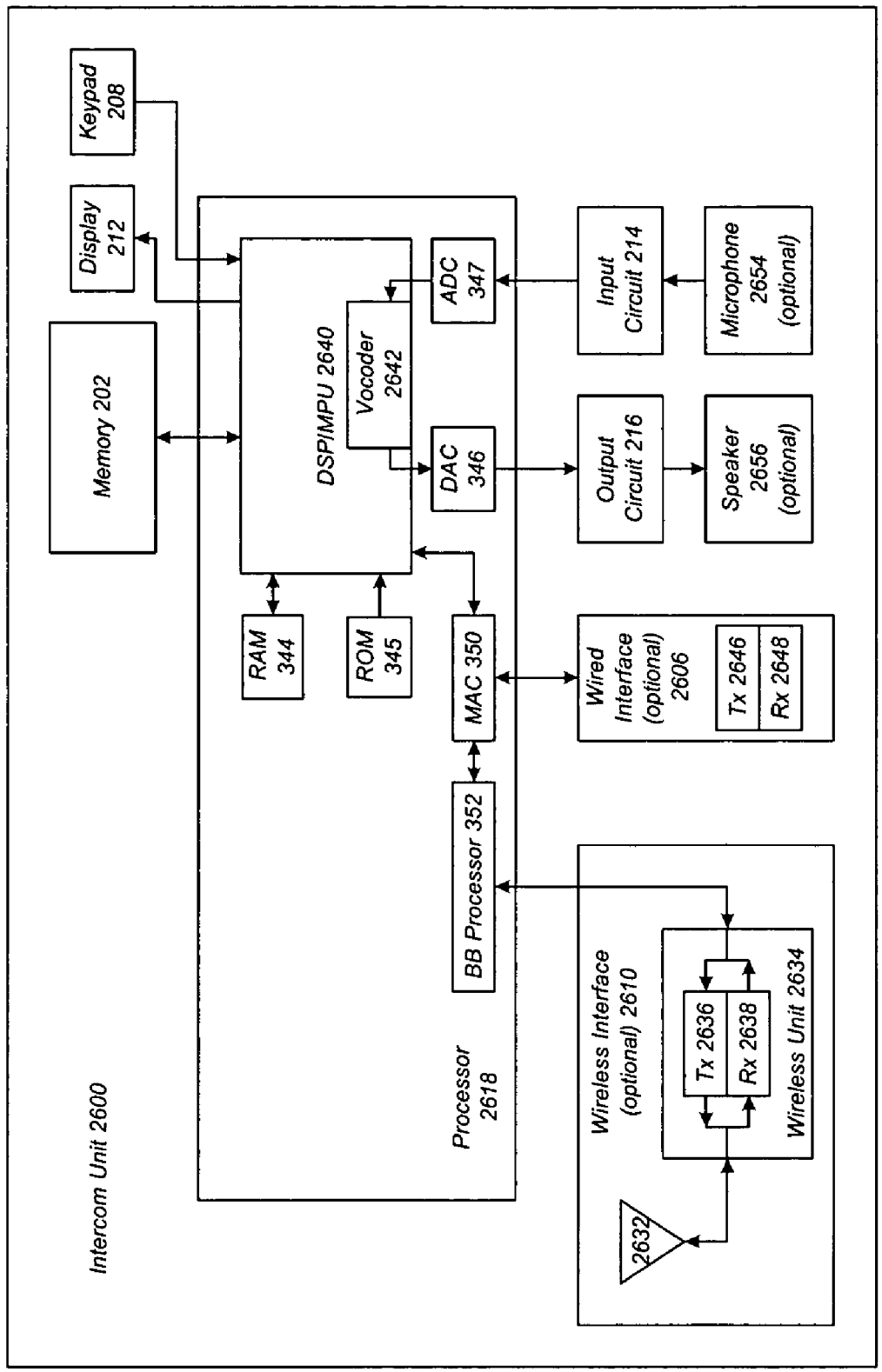
FIG. 26 shows an intercom according to an embodiment of the present invention.

FIG. 26 shows an intercom 2600 according to an embodiment of the present invention that can function as any of intercoms 2502 of FIG. 25. Intercom 2600 is similar to media player 1600 of FIG. 16. However, codec 348 has been replaced by a vocoder 2642 adapted to encode and decode voice data according to methods well-known in the relevant arts. In some embodiments, an optional microphone 2654 is connected to input circuit 214. In some embodiments, an optional speaker 2656 is connected to output circuit 216. In other embodiments, intercom 2600 includes a connector to allow external speakers and microphones to be connected to input circuit 214 and output circuit 216.

Operation of intercom 2600 is controlled by the user through keypad 208, which is in communication with DSP/MPU 2640. Status of the intercom is provided to the user by display 212 in accordance with DSP/MPU 2640. Keypad 208 can include controls for adjusting the gain of input circuit 214 and output circuit 216, for selecting other intercom units 2600, for listening to selected other intercoms 2600, for talking to selected other intercoms 2600, for broadcasting to all other intercom units 2600 within a selected group, and for other common intercom functions. Keypad 208 can be fabricated together with display 212 as a touch screen. In other embodiments, keypad 208 is voice-activated.

Figure 27:
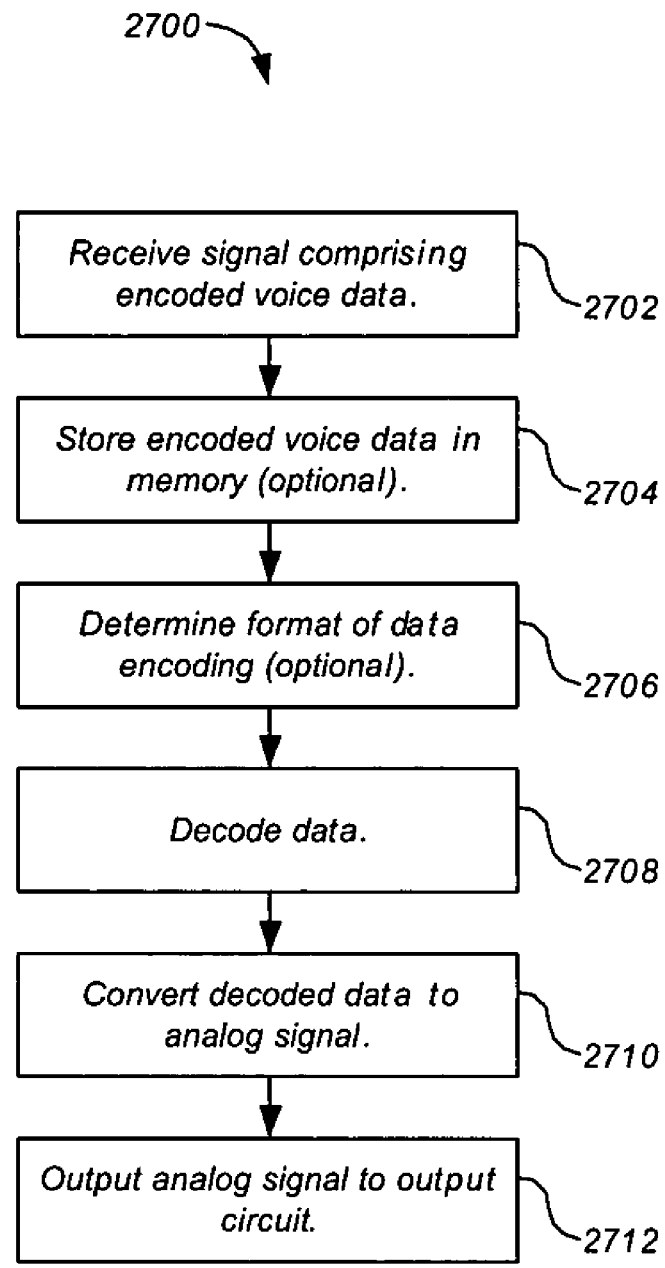
FIG. 27 shows a receive process that can be performed by the intercom of FIG. 26 according to a preferred embodiment.

FIG. 27 shows a receive process 2700 that can be performed by intercom 2600 according to a preferred embodiment. Intercom 2600 receives a signal representing encoded voice data (step 2702). In a wireless intercom system, the encoded voice data is received by wireless receiver 2638 over antenna 2632. In a wired intercom system, the encoded voice data is received by wired receiver 2648.

DSP/MPU 2640 controls the flow of data through interfaces 2606 and/or 2610 and optionally stores the encoded voice data in memory 202 (step 2704).

In some embodiments, after the selected data is stored in memory 202, processor 2618 determines the format of data encoding from the retrieved data (step 2706). In other embodiments, the format of data encoding is predetermined. In either case, the data can be processed immediately without storage. The data encoding and decoding algorithms can be stored in any of memory 202, RAM 2624, or ROM 2626. This feature allows future encoding and decoding formats to be easily implemented for the intercom.

Vocoder 2642 decodes the data in accordance with the determined format (step 2708). DAC 346 converts the decoded data to an analog signal (step 2710). The analog signal is output to output circuit 216 (step 2712), which sets the analog signal to an appropriate level. This signal is optionally fed to optional speaker 2656.

Figure 28:
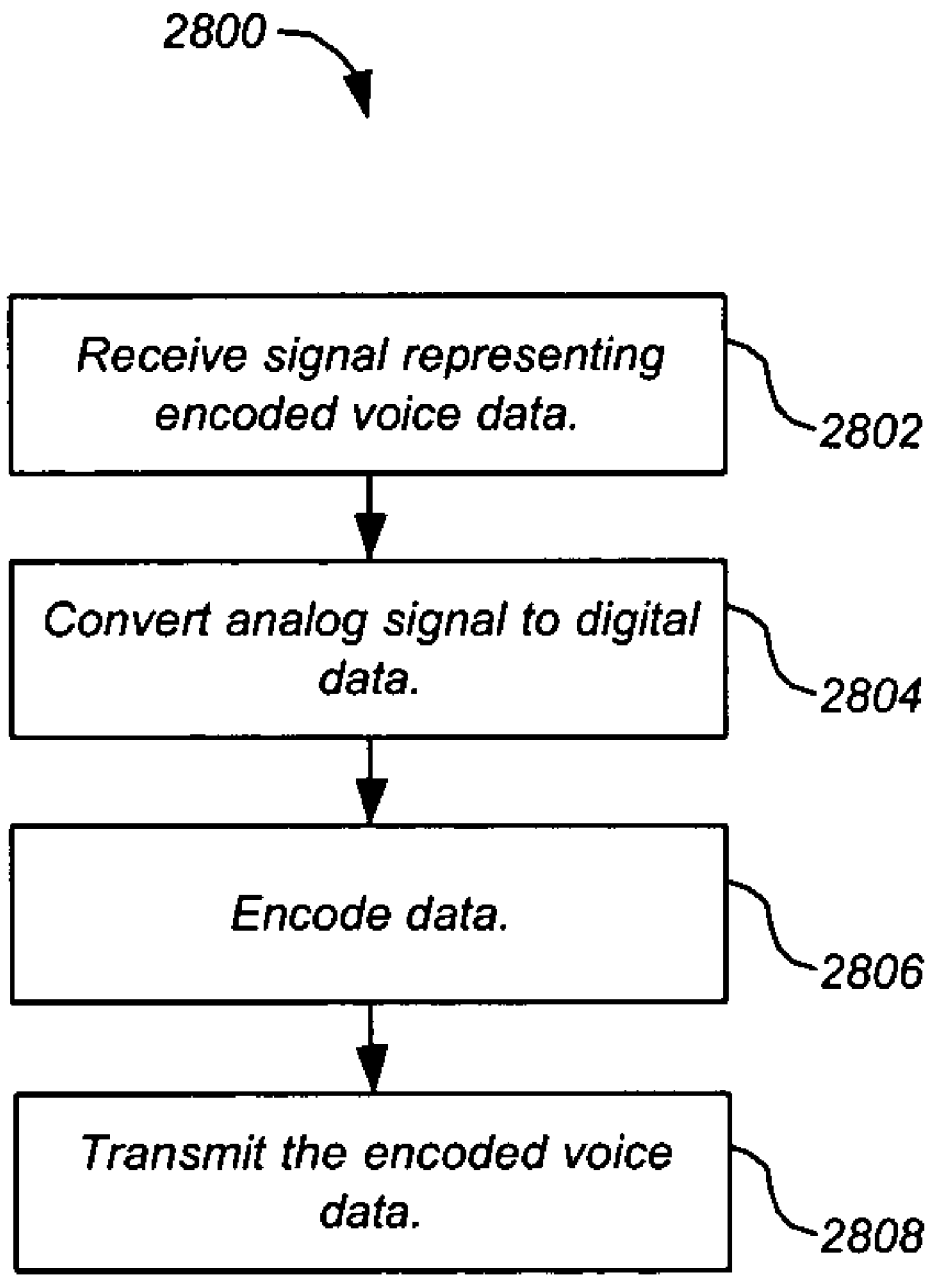
FIG. 28 shows a transmit process that can be performed by the intercom of FIG. 26 according to a preferred embodiment.

FIG. 28 shows a transmit process 2800 that can be performed by intercom unit 2600 according to a preferred embodiment.

Input circuit 214 receives an analog signal representing voice data and adjusts the gain of the analog signal as needed (step 2802). This signal is optionally produced by optional microphone 2654. ADC 347 digitizes the analog signal (step 2804). Vocoder 2642 encodes the voice data in accordance with a predetermined format (step 2806).

Intercom 2600 transmits the encoded voice data (step 2808). In a wireless intercom system, the encoded voice data is transmitted by wireless transmitter 2636 over antenna 2632. In a wired intercom system, the encoded voice data is transmitted by wired transmitter 2646. DSP/MPU 2640 controls the flow of data through interfaces 2606 and/or 2610 and stores the voice data in memory 202 if needed.

Intercom 2600 can perform other functions as well. For example, intercom 2600 can display the identity of another intercom 2600 when that intercom attempts contact, based on a signal transmitted by that intercom, similar to "caller-ID" telephone functions.

Figure 29:
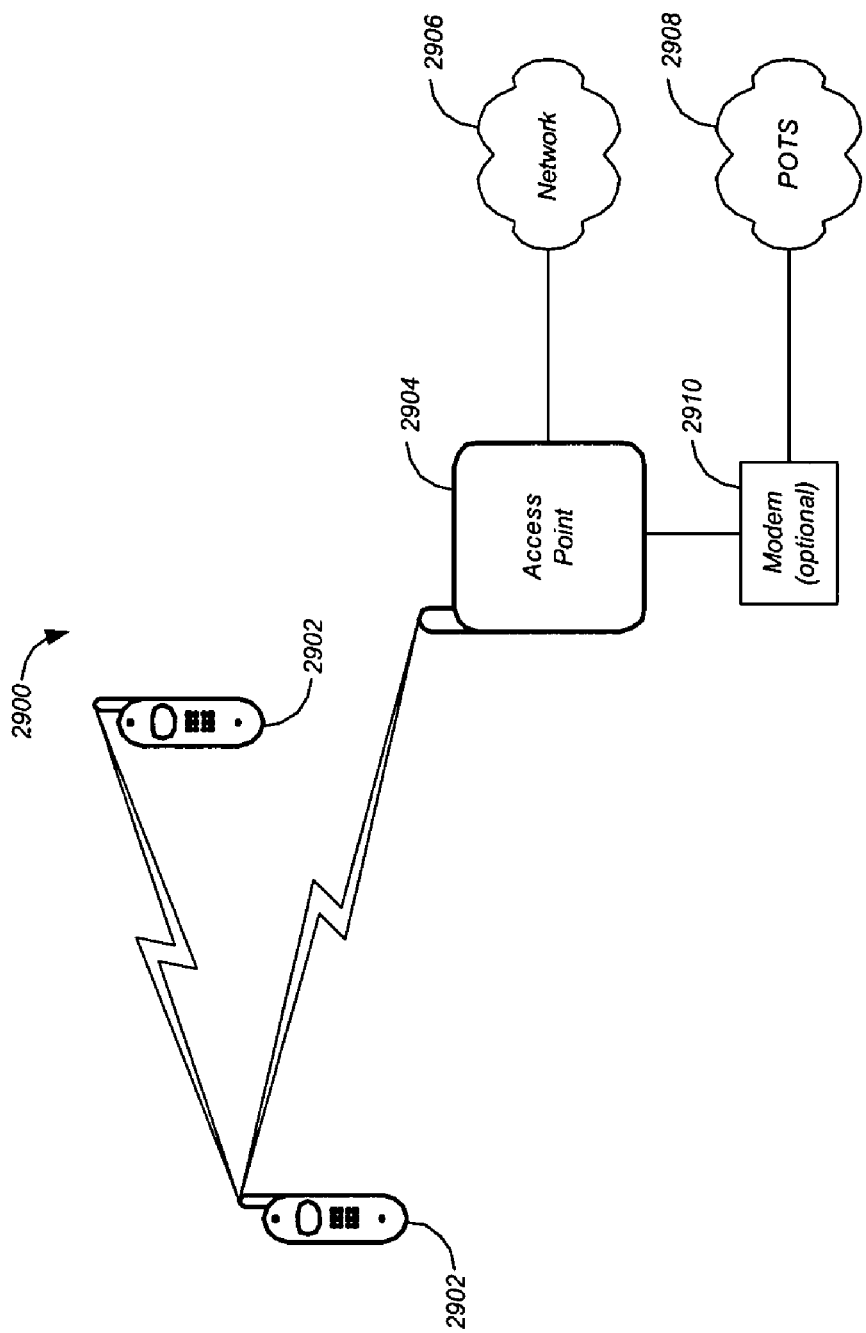
FIG. 29 shows a telephone system according to a preferred embodiment.

FIG. 29 shows a telephone system 2900 according to a preferred embodiment. Telephone system 2900 comprises one or more telephones 2902, which can be portable or fixed. The fixed telephones 2902 can be wired or wireless, while portable telephones 2902 are preferably wireless. Telephone system 2900 comprises an access point 2904 with which telephones 2902 communicate. Access point 2904 can communicate with other devices and networks 2906, such as the Internet, a local area network, a personal computer, or any other network device for Internet protocol (IP) telephony and the like, to a digital telephone network, or to a plain old telephone system (POTS) 2808 over an optional modem 2910.

Figure 30:
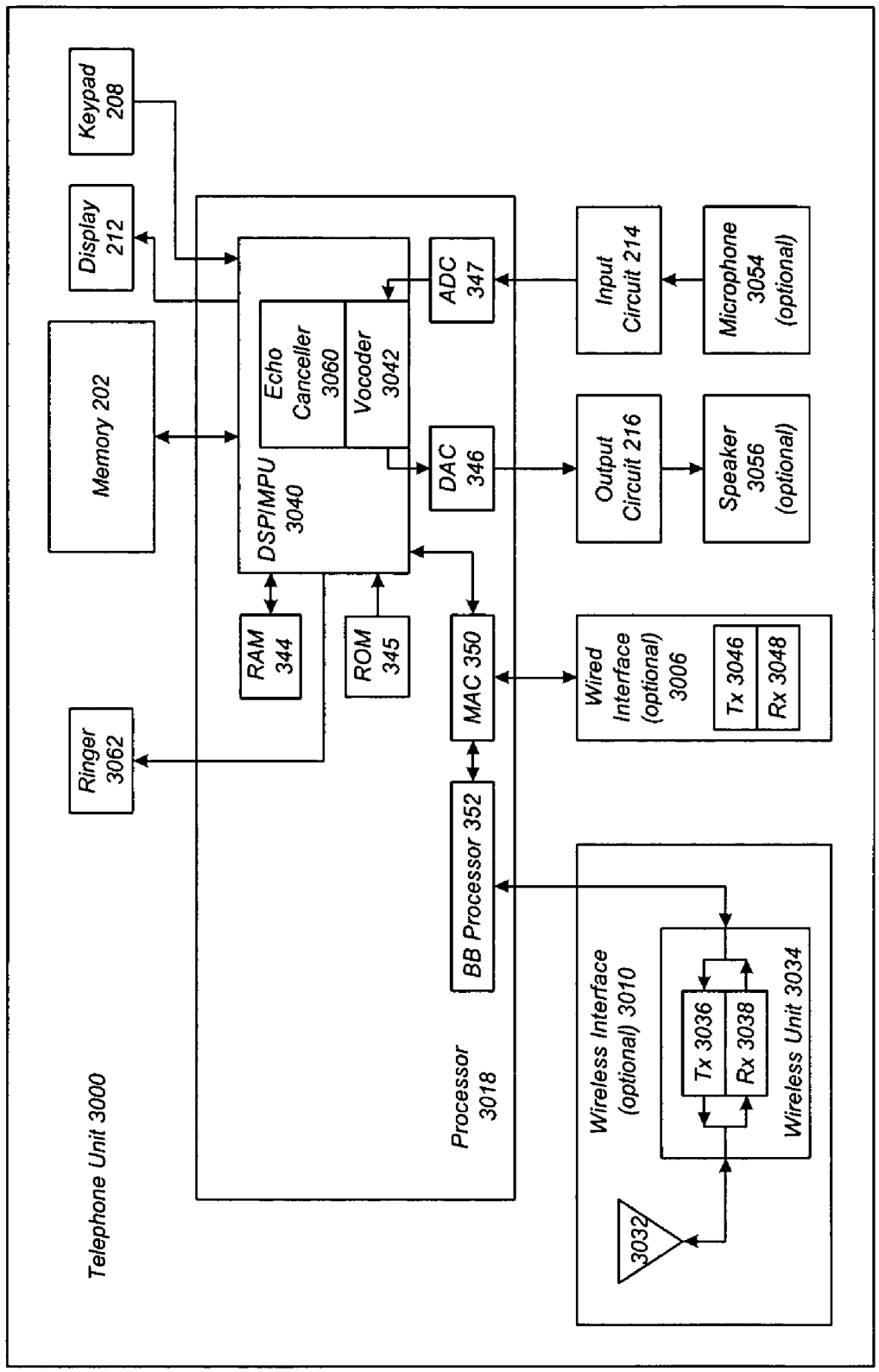
FIG. 30 shows an telephone according to an embodiment of the present invention.

FIG. 30 shows a telephone 3000 according to an embodiment of the present invention that can function as any of telephones 2902 of FIG. 29. Telephone 3000 is similar to intercom 2600 of FIG. 26. However, telephone 3000 also includes an optional ringer 3062 to notify a user of incoming calls or new voicemail. In addition, telephone 3000 includes an optional echo canceller 3060 for canceling local and/or far-end echo. In one embodiment, echo canceller 3060 operates in the digital domain. However, in other embodiments, echo canceller 3060 operates on analog signals. Although depicted in FIG. 30 as being implemented within DSP/MPU 2540, echo canceller 3060 can be implemented elsewhere in processor 3018, or even outside processor 3018.

Operation of telephone 3000 is controlled by the user through keypad 208, which is in communication with DSP/MPU 2640. Status of the telephone is provided to the user by display 212 in accordance with DSP/MPU 2640. Keypad 208 can include controls for adjusting the gain of input circuit 214 and output circuit 216, for selecting other telephone units 3000, for broadcasting to all other telephone units 3000 within a selected group, and for other common telephone functions. Keypad 208 can be fabricated together with display 212 as a touch screen. In other embodiments, keypad 208 is voice-activated.

Telephone 3000 can include caller-identification features. For example, telephone 3000 can receive a caller-identification signal representing information describing the caller (that is, the sender of the voice data). Processor 3018 then causes display 212 to display this information to the user. As another example, the processor can reject certain callers by comparing the caller-identification information to predetermined criteria.

Telephone 3000 can include voicemail features. For example, telephone 3000 can answer an incoming call, play a message, and store incoming voice data in memory 202, preferably before decoding. Display 212 can display a voicemail indication indicating that new voicemail has been stored. Keypad 208 can include a voicemail key that causes processor 3018 to decode the stored voice data and to send the decoded voice data to output circuit 216.

Telephone 3000 can include private branch exchange (PBX) features. For example, telephone 3000 can receive an incoming telephone call including a destination telephone number, select a destination such as a telephone 3000 or other device based on the destination telephone number, and send a new call signal to the destination. On receiving an answer signal from the destination, telephone 3000 connects the destination with the caller. The PBX features can be implemented in a PBX module either within access point 3004 or elsewhere. Telephone 3000 implements transmit and receive processes similar to those described with respect to FIGS. 26 and 27.

Figure 31:
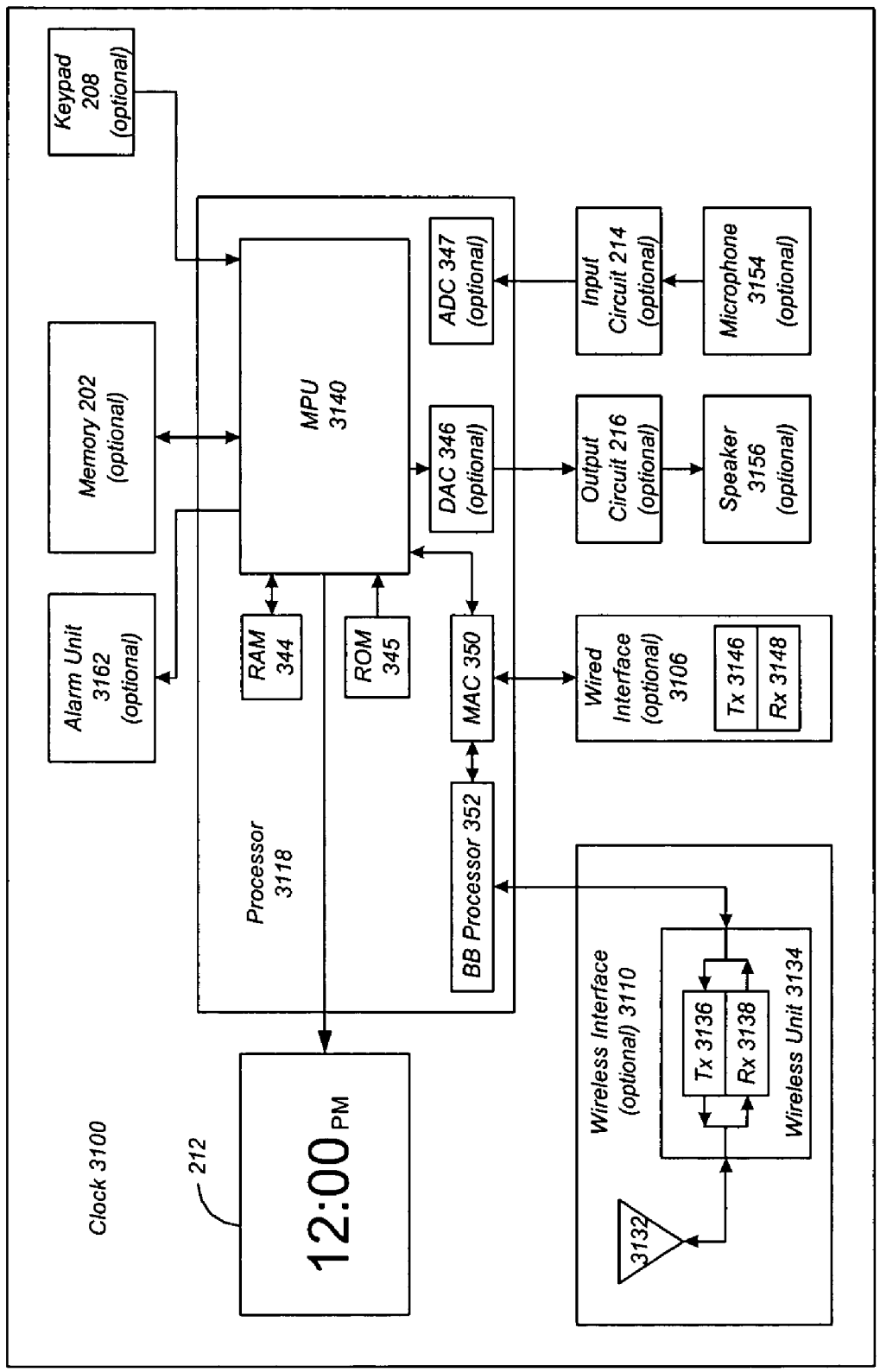
FIG. 31 shows a clock according to an embodiment of the present invention.

FIG. 31 shows a clock 3100 according to an embodiment of the present invention. Clock 3100 includes a processor 3118 that includes a microprocessor unit (MPU) 3140, a volatile memory such as random access memory (RAM) 344, a non-volatile memory such as read only memory (ROM) 345, an optional digital to analog converter (DAC) 346, an optional analog to digital converter (ADC) 347, a media access controller (MAC) 350, and a baseband processor 352. Processor 3118 is preferably implemented as a single integrated circuit. A clock having a processor implemented as a single integrated circuit can be fabricated at lower cost and have lower energy consumption. Alternatively, processor 3118 may be implemented by discrete components.

ROM 345 stores programmed instructions for processor 3118 and MPU 3140 to control the operation of clock 3100. RAM 344 is provided as a working memory for MPU 3140.

Clock 3100 also includes an interface, which can be a wired interface 3106, a wireless interface 3110, or a combination of the two. Clock 3100 further includes an optional memory 202, an optional input circuit 214, an optional output circuit 216, an optional keypad 208, a display 212, and an optional alarm unit 3162. Wireless interface 3110 includes a wireless antenna 3132 and a wireless unit 3110 that includes a wireless receiver 3138 and an optional wireless transmitter 3136. Wired interface 3106 includes a receiver 3148 and an optional transmitter 3146. Keypad 208 can be fabricated together with display 212 as a touch screen.

Memory 202 comprises a solid state memory, such as, for example dynamic random access memory (solid state memory), flash memory, EEPROM, or the like. The amount of solid state memory supplied is selected to minimize energy consumption.

Antenna 3132 is a conventional antenna for receiving and transmitting wireless signals. Wireless unit 3110 converts wireless signals received by antenna 3132 to analog baseband signals, and converts analog baseband signals received from baseband processor 352 to wireless signals for transmission by antenna 3132. Baseband processor 352 converts analog baseband signals received from wireless unit 3110 to a digital bitstream, and converts a digital bitstream received from MAC 350 to analog baseband signals, both according to well-known methods. MAC 350 frames the digital bitstream produced by baseband processor 352, and filters the frames to select the frames addressed to processor 3118, both according to well-known methods. MAC 350 also converts frames received from processor 3118 to a digital bitstream for baseband processor 352, also according to well-known methods. In some implementations, MAC 350 includes an embedded microprocessor.

In some embodiments, clock 3100 can download and play media data. For example, clock 3100 can be implemented with an Internet radio or an MP3 player such as those described above. In such embodiments, media data, which was previously digitized, may be obtained (downloaded) from a personal computer, network appliance, local area network, Internet and the like, including wireless networks with infrastructure, such as a designated access point, peer-to-peer wireless networks, and the like. Such external devices communicate with the clock via wired interface 3106 and/or wireless interface 3110, which are controlled by processor 3118. Wired interface 3106 may be implemented, for example, as a parallel interface, serial interface, USB, Ethernet connection, IEEE 1394 (a.k.a. Firewire), and the like. Wireless interface 3110 may be implemented, for example, as an infrared interface, IEEE 802.15, IEEE 802.11, Bluetooth™ and the like. Again, the present invention is independent of the interface selected. Media data is then stored in memory 202.

Alternatively, media data may be obtained directly from an external analog source, such as a microphone or video camera, connected to optional input circuit 214. Input circuit 214 takes the input signal from external device and sets the analog signal to an appropriate level. The analog signal is then converted to a digital signal and decoded using a selected format by processor 3118, as will be described herein below. The decoded digital data is similarly stored in memory 202.

Figure 32:
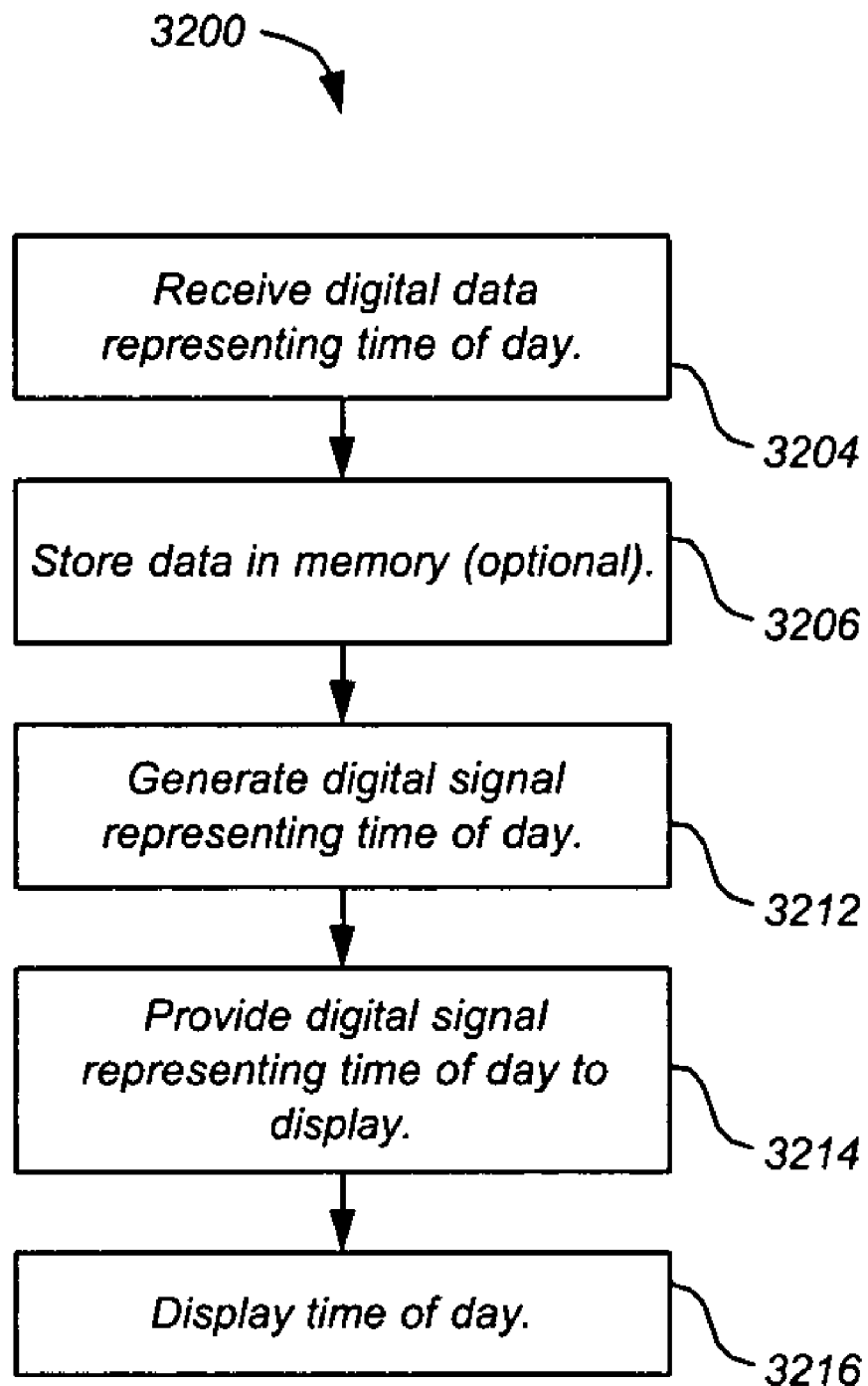
FIG. 32 shows a process that can be performed by the clock of FIG. 32 according to a preferred embodiment.

FIG. 32 shows a process 3200 that can be performed by clock 3100 according to a preferred embodiment. Operation of clock 3100 can be controlled by the user through optional keypad 208, which is in communication with MPU 3140. Status of the clock is provided to the user by display 3112 in accordance with MPU 3140.

When clock 3100 is in communication with a personal computer, network appliance, local area network, Internet, or the like, digital data representing time of day, day, date, year, tides, weather, wind speeds, surf conditions, and so on is downloaded to clock 3100.

The digital data is received by clock 3100 as a signal comprising the digital data (step 3204). MPU 3140 controls the flow of data through interfaces 3106 and/or 3110 and stores the data in memory 202 (step 3206).

Processor 3118 generates a digital signal representing the time of day based on the digital data (step 3212). Processor 3118 provides the digital signal representing the time of day to display 3112 (step 3214), which displays the time of day (step 3216).

Embodiments of clock 3100 are especially useful for receiving streaming media from broadcasts such as internet radio stations and other clocks. Some implementations feature a "broadcast" mode where the clock plays a media selection while wirelessly transmitting the media selection, either compressed or uncompressed, or in analog form, such that other clocks can receive the broadcast media and play it at the same time as the broadcasting clock.

Some embodiments permit a user to operate keypad 208 to alter settings within clock 3100. In other embodiments the user alters settings by speaking aloud. This sound is captured by input circuit 214, and interpreted as a selection. The user operations are interpreted as control signals, which are transmitted by transmitter 3136 or 3146 to the provider of the encoded digital data, which alters the contents of the encoded digital data accordingly. For example, the user can request different information to be downloaded to the clock, such as changing the locations from which time or weather information is reported.

The user can also enter criteria against which clock 3100 compares the received digital data. For example, the user can enter a time as an alarm setting. When the received digital data represents a time matching the time of the alarm setting, processor 3118 provides an alarm signal that causes alarm unit 3162 and/or display 212 to manifest an alarm indication. Other criteria can be entered alone or in combination, For example, the user can specify a "surfs up" indication be displayed on display 212 when wind, tide, and surf information received in the encoded digital data meet criteria entered by the user.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Neverthe-less, it will be understood that various modifications may be made without departing from the spirit and scope of the invention. Accordingly, other implementations are within the scope of the following claims.

What is claimed is:

1. A telephone comprising:
a receiver adapted to receive a signal representing encoded first voice data;
a processor comprising
  a media access controller adapted to obtain the encoded first voice data from the signal, and
  a digital signal processor adapted to decode the encoded first voice data obtained by the media access controller;
an output circuit;
a digital-to-analog converter adapted to convert the first voice data decoded by the digital signal processor to a first analog signal, wherein the first analog signal is output to the output circuit;
an input circuit;
an analog-to-digital converter adapted to receive a second analog signal from the input circuit, and to convert the second analog signal to second voice data;
wherein the digital signal processor is further adapted to encode the second voice data; and
a transmitter adapted to transmit signals representing the encoded second voice data.

2. The telephone of claim 1:
wherein the encoded first voice data is decoded by a process that decompresses the encoded first voice data; and
wherein the second voice data is encoded by a process that compresses the second voice data.

3. The telephone of claim 1, further comprising:
a vocoder adapted to decode the encoded first voice data and to encode the second voice data.

4. The telephone of claim 3:
wherein the digital signal processor is further adapted to determine a code of the encoded first voice data obtained by the media access controller; and
wherein the vocoder is further adapted to decode the encoded first voice data in accordance with the determined code.

5. The telephone of claim 1, further comprising:
a display;
wherein the receiver is further adapted to receive a signal representing information describing a sender of the first voice data; and
wherein the processor is further adapted to cause the display to display the information describing the sender of the first voice data.

6. The telephone of claim 1:
wherein the receiver is further adapted to receive a signal representing information describing a sender of the first voice data; and
wherein the processor is further adapted to reject the first voice data when the information describing the sender of the first voice data meets predetermined criteria.

7. The telephone of claim 1, further comprising:
an echo cancellation circuit.

8. The telephone of claim 1, further comprising:
a telephone call indicator adapted to manifest a call indication when the transmitter receives a signal representing an incoming telephone call.

9. The telephone of claim 1, further comprising:
a storage device;
wherein the processor is further adapted to answer an incoming telephone call, and to store the encoded first voice data in the storage device.

10. The telephone of claim 9, further comprising:
a voicemail key;
wherein, in response to operation of the voicemail key,
the digital signal processor is further adapted to decode the encoded first voice data stored in the storage device, and
the processor is further adapted to send the decoded second voice data to the output circuit.

11. The telephone of claim 1:
wherein the receiver is further adapted to receive a telephone call signal representing an incoming telephone call, the telephone call signal comprising a destination telephone number;
wherein the processor is further adapted to select a further telephone based on the destination telephone number; and
wherein the transmitter is further adapted to send a new call signal to the further telephone.

12. The telephone of claim 11:
wherein the receiver is further adapted to receive an answer signal from the further telephone in response to the new call signal; and
wherein in response to the answer signal,
the receiver receives encoded third voice data from the further telephone and encoded fourth voice data from a sender of the telephone call signal, and
the transmitter sends the encoded fourth voice data to the sender of the telephone call signal and sends the encoded third voice data to the further telephone.

13. The telephone of claim 1, wherein the receiver is a wireless receiver.

14. The telephone of claim 1, wherein the transmitter is a wireless transmitter.

15. The telephone of claim 1, wherein the telephone complies with a standard selected from the group consisting of:

IEEE 802.11;
IEEE 802.11a;
IEEE 802.11b;
IEEE 802.11g;
IEEE 802.11h; and
IEEE 802.11i.

16. A telephone comprising:
means for receiving a signal representing encoded first voice data;
processor means for processing the signal comprising
media access controller means for obtaining the encoded first voice data from the signal, and
digital signal processor means for decoding the first voice data obtained by the media access controller means;
digital-to-analog converter means for converting the encoded first voice data decoded by the digital signal processor means to a first analog signal, wherein the first analog signal is output to an output circuit;
analog-to-digital converter means for receiving a second analog signal from an input circuit, and for converting the second analog signal to second voice data; and
wherein the digital signal processor is further adapted to encode the second voice data; and
transmitter means for transmitting signals representing the encoded second voice data.

17. The telephone of claim 16:
wherein the encoded first voice data is decoded by a process that decompresses the encoded first voice data; and
wherein the second voice data is encoded by a process that compresses the second voice data.

18. The telephone of claim 16, further comprising:
vocoder means for decoding the encoded first voice data and for encoding the second voice data.

19. The telephone of claim 18:
wherein the digital signal processor means determines a code of the encoded first voice data obtained by the media access controller means; and
wherein the vocoder means decodes the encoded first voice data in accordance with the determined code.

20. The telephone of claim 16, wherein the receiver means receives a signal representing information describing a sender of the first voice data, the telephone further comprising:
display means for displaying the information describing the sender of the first voice data.

21. The telephone of claim 16:
wherein the receiver means receives a signal representing information describing a sender of the first voice data; and
wherein the processor means rejects the first voice data when the information describing the sender of the first voice data meets predetermined criteria.

22. The telephone of claim 16, further comprising:
echo cancellation means for canceling echoes.

23. The telephone of claim 16, further comprising:
telephone call indicator means for manifesting a call indication when the transmitter means receives a signal representing an incoming telephone call.

24. The telephone of claim 16, wherein the processor is further adapted to answer an incoming telephone call, further comprising:
storage device means for storing the encoded first voice data.

25. The telephone of claim 24, further comprising:
voicemail key means;
wherein, in response to operation of the voicemail key means,
the digital signal processor means decodes the encoded first voice data stored in the storage device means, and
the processor means sends the decoded second voice data to the output circuit.

26. The telephone of claim 16:
wherein the receiver means receives a telephone call signal representing an incoming telephone call, the telephone call signal comprising a destination telephone number;
wherein the processor means selects a further telephone based on the destination telephone number; and
wherein the transmitter means sends a new call signal to the further telephone.

27. The telephone of claim 26:
wherein the receiver means receives an answer signal from the further telephone in response to the new call signal; and
wherein in response to the answer signal,
the receiver means receives encoded third voice data from the further telephone and encoded fourth voice data from a sender of the telephone call signal, and
the transmitter means sends the encoded fourth voice data to the sender of the telephone call signal and sends the encoded third voice data to the further telephone.

28. The telephone of claim 16, wherein the receiver means is wireless.

29. The telephone of claim 16, wherein the transmitter means is wireless.

30. The telephone of claim 16, wherein the telephone complies with a standard selected from the group consisting of:
IEEE 802.11;
IEEE 802.11a;
IEEE 802.11b;
IEEE 802.11g;
IEEE 802.11h; and
IEEE 802.11i.

* * * * *